United States Patent
Green et al.

(10) Patent No.: US 11,584,665 B2
(45) Date of Patent: Feb. 21, 2023

(54) INTERNAL ELECTRICAL CONNECTIONS FOR CONCENTRIC TUBULAR ELECTROCHEMICAL CELLS

(71) Applicant: Evoqua Water Technologies LLC, Pittsburgh, PA (US)

(72) Inventors: Andrew Green, Leeds (GB); Li-Shiang Liang, Harvard, MA (US); Joshua Griffis, Ashburnham, MA (US); Paul Beddoes, Shirehampton (GB)

(73) Assignee: Evoqua Water Technologies LLC, Pittsburgh, PA (US)

( * ) Notice: Subject to any disclaimer, the term of this patent is extended or adjusted under 35 U.S.C. 154(b) by 120 days.

(21) Appl. No.: 16/603,017

(22) PCT Filed: Apr. 13, 2018

(86) PCT No.: PCT/US2018/027574
§ 371 (c)(1),
(2) Date: Dec. 2, 2019

(87) PCT Pub. No.: WO2018/191669
PCT Pub. Date: Oct. 18, 2018

(65) Prior Publication Data
US 2021/0107812 A1    Apr. 15, 2021

Related U.S. Application Data

(60) Provisional application No. 62/485,542, filed on Apr. 14, 2017.

(51) Int. Cl.
*C25B 9/17* (2021.01)
*C25B 11/00* (2021.01)
(Continued)

(52) U.S. Cl.
CPC ........ *C02F 1/46109* (2013.01); *C02F 1/4674* (2013.01); *C02F 2001/46119* (2013.01);
(Continued)

(58) Field of Classification Search
CPC .... C25B 9/17; C25B 1/04; C25B 9/00; C25B 9/19; C25B 9/70; C25B 11/00;
(Continued)

(56) References Cited

U.S. PATENT DOCUMENTS

| 3,393,873 A | 7/1968 | Larson |
| 3,953,227 A | 4/1976 | Jones et al. |

(Continued)

FOREIGN PATENT DOCUMENTS

| WO | 2016133983 A1 | 8/2016 |
| WO | 2016133985 A1 | 8/2016 |
| WO | 2017049052 A1 | 3/2017 |

*Primary Examiner* — Zulmariam Mendez

(57) ABSTRACT

Self-cleaning electrochemical cells, systems including self-cleaning electrochemical cells, and methods of operating self-cleaning electrochemical cells are disclosed. The self-cleaning electrochemical cell can include a plurality of concentric electrodes disposed in a housing, a fluid channel defined between the concentric electrodes, and an electrical connector positioned at a distal end of a concentric electrode and electrically connected to the electrode. The electrical connectors may be configured to provide a substantially even current distribution to the concentric electrode and minimize a zone of reduced velocity occurring downstream from the electrical connector. The electrical connector may be configured to cause a temperature of an electrolyte solution to increase by less than about 0.5° C. while transmitting at least 100 W of power.

19 Claims, 36 Drawing Sheets

(51) Int. Cl.
 *C25B 1/04* (2021.01)
 *C02F 1/461* (2023.01)
 *C02F 1/467* (2023.01)
 *C02F 103/08* (2006.01)

(52) U.S. Cl.
 CPC ............... *C02F 2001/46171* (2013.01); *C02F 2103/08* (2013.01); *C02F 2201/4611* (2013.01); *C02F 2201/46155* (2013.01); *C02F 2303/04* (2013.01)

(58) Field of Classification Search
 CPC ......... C25B 9/23; C25B 9/40; C02F 1/46109; C02F 1/4674; C02F 2001/46119; C02F 2001/46171; C02F 2103/08; C02F 2201/4611; C02F 2201/46155; C02F 2303/04
 See application file for complete search history.

(56) References Cited

U.S. PATENT DOCUMENTS

| | | |
|---|---|---|
| 5,690,498 A | 11/1997 | Sobhani |
| 2010/0038012 A1 | 2/2010 | Tucker et al. |
| 2011/0024361 A1 | 2/2011 | Schwartzel et al. |
| 2012/0037003 A1 | 2/2012 | Johnsgard et al. |

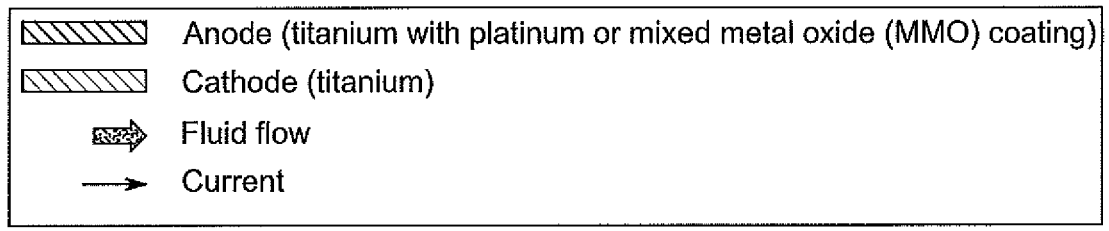
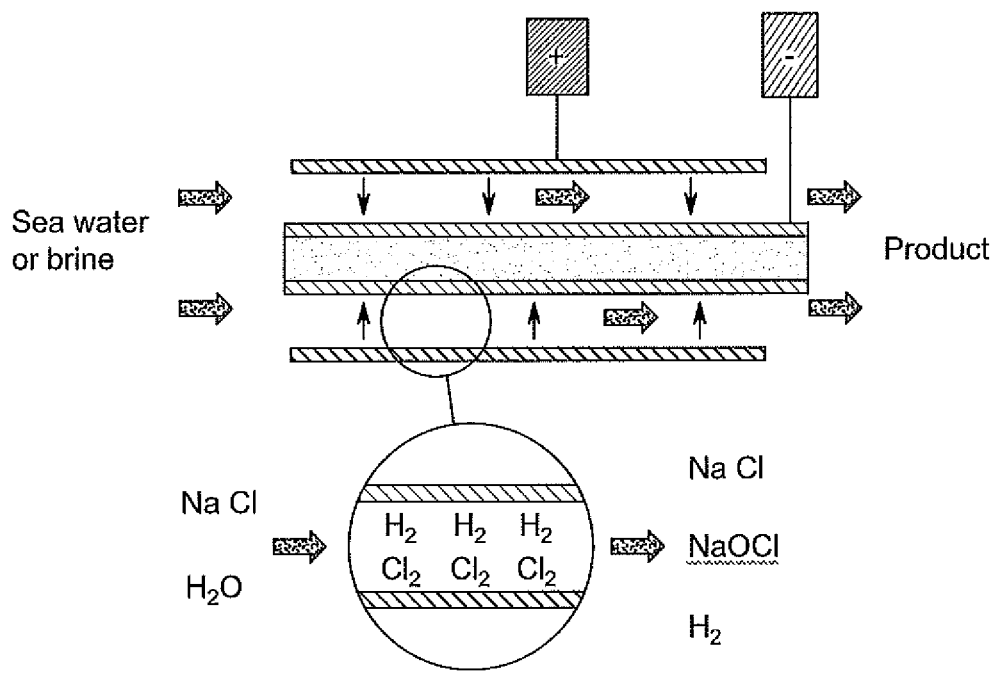
FIG. 2A

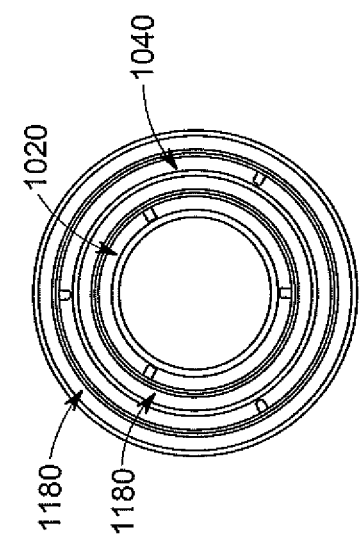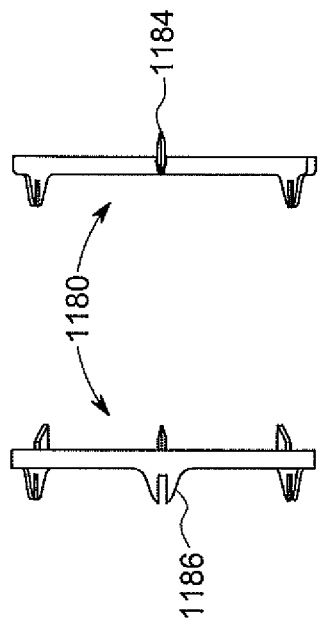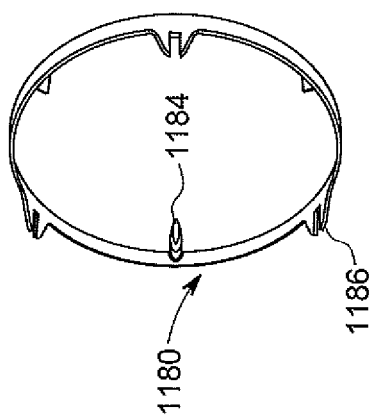

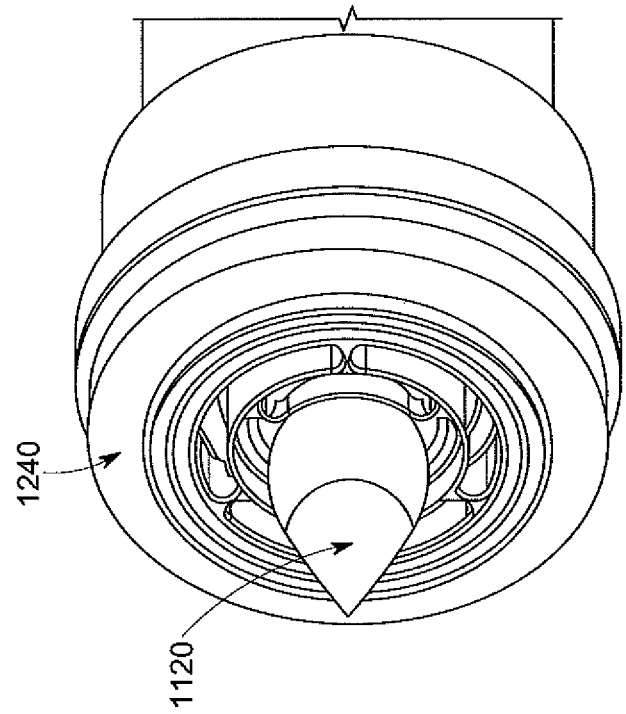
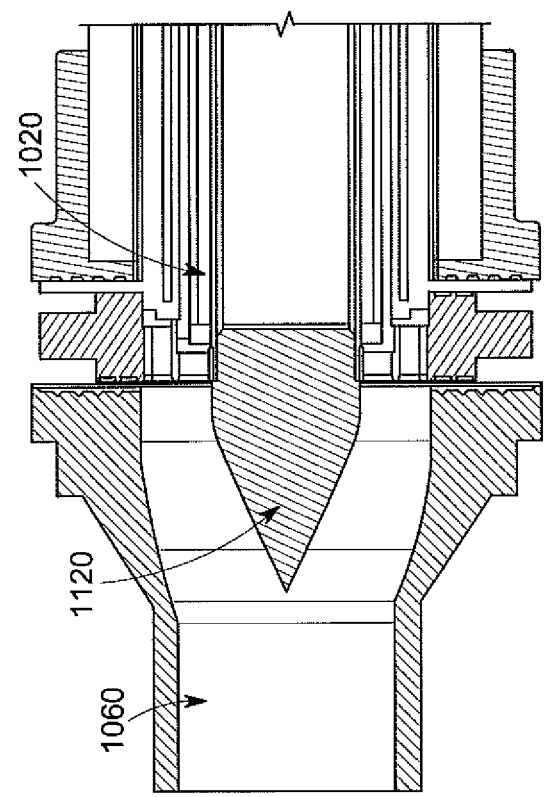
FIG. 11A
FIG. 11B

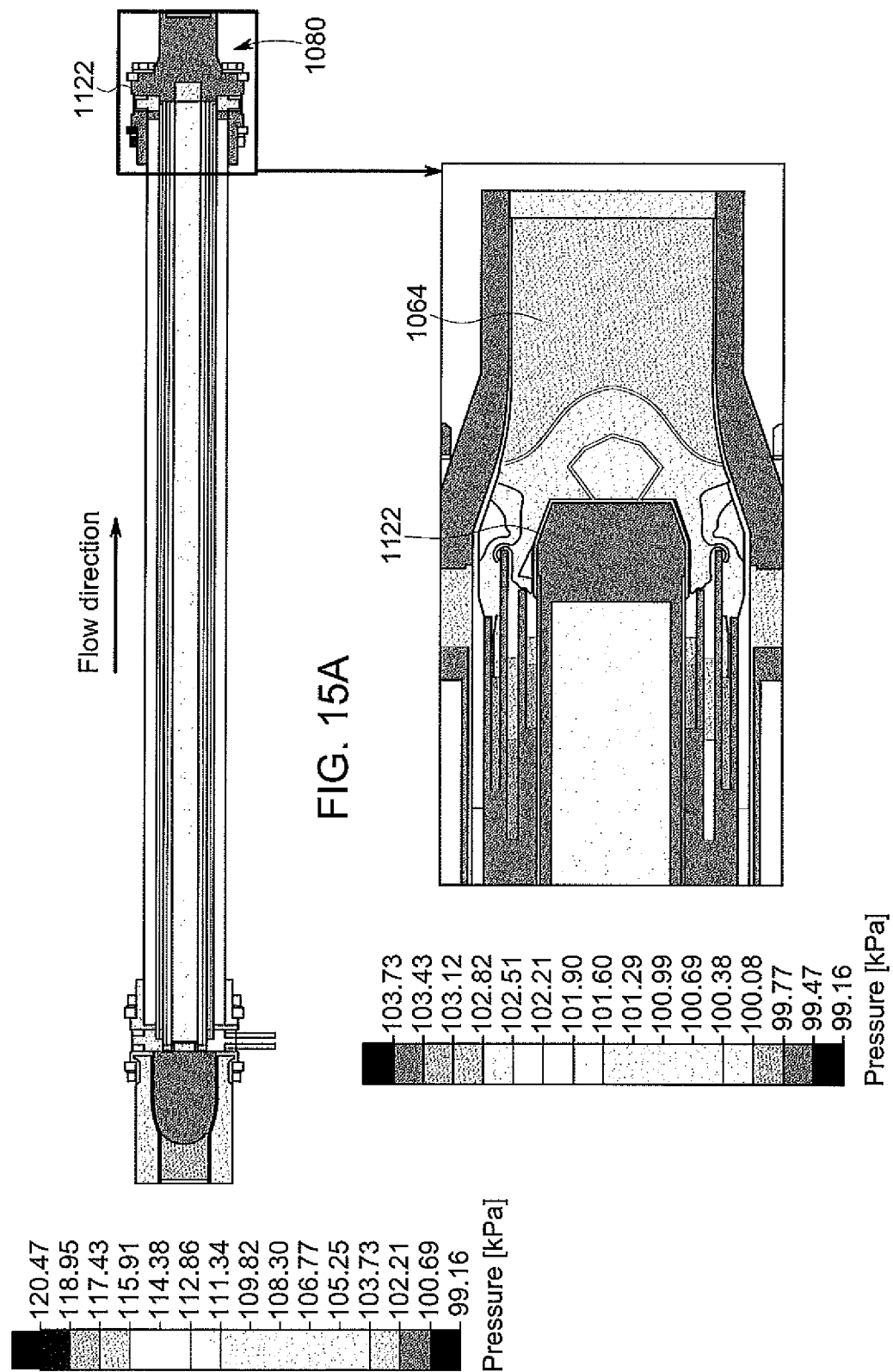

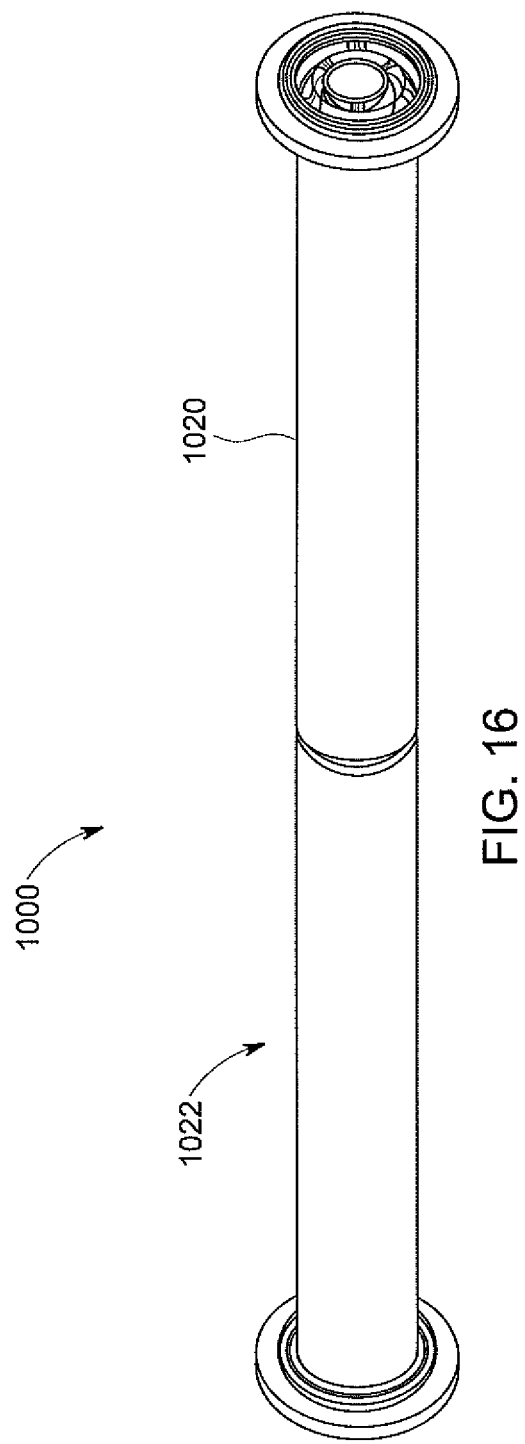

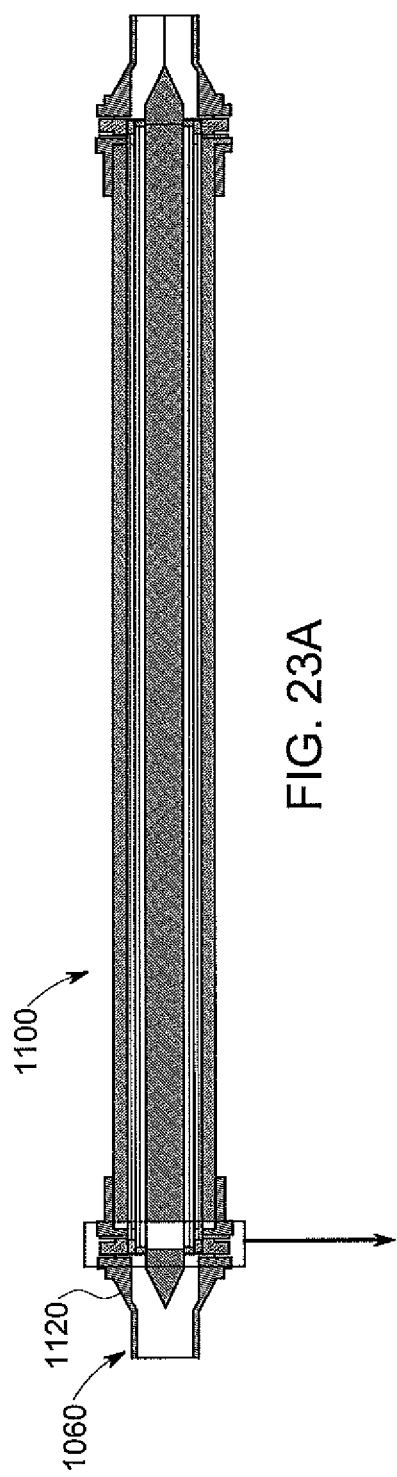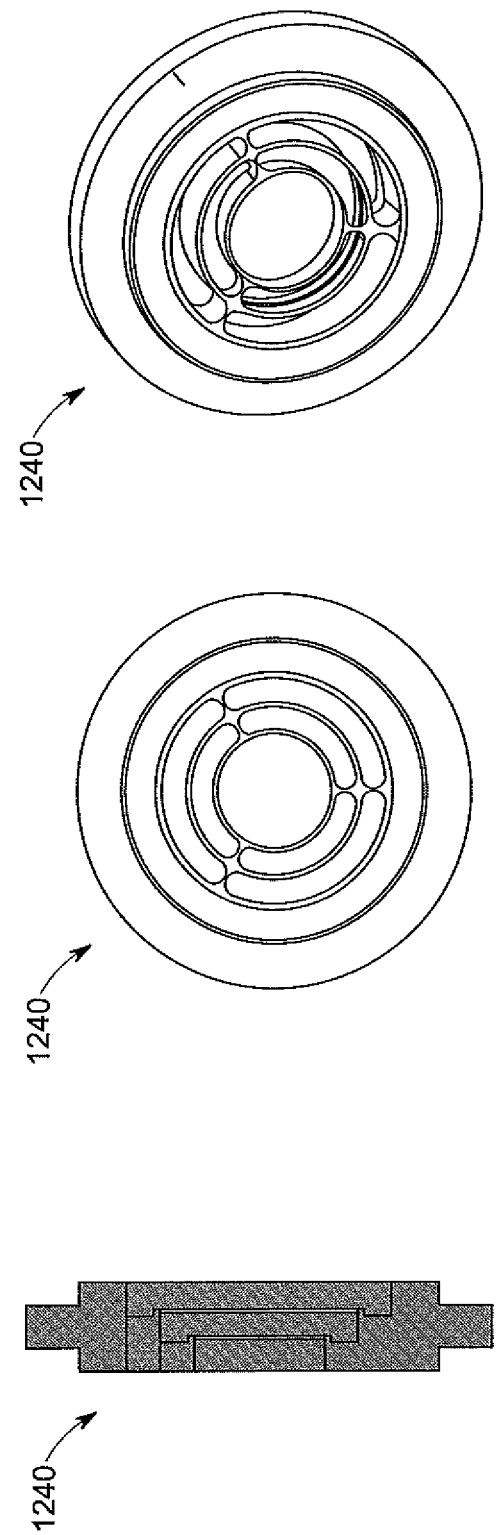

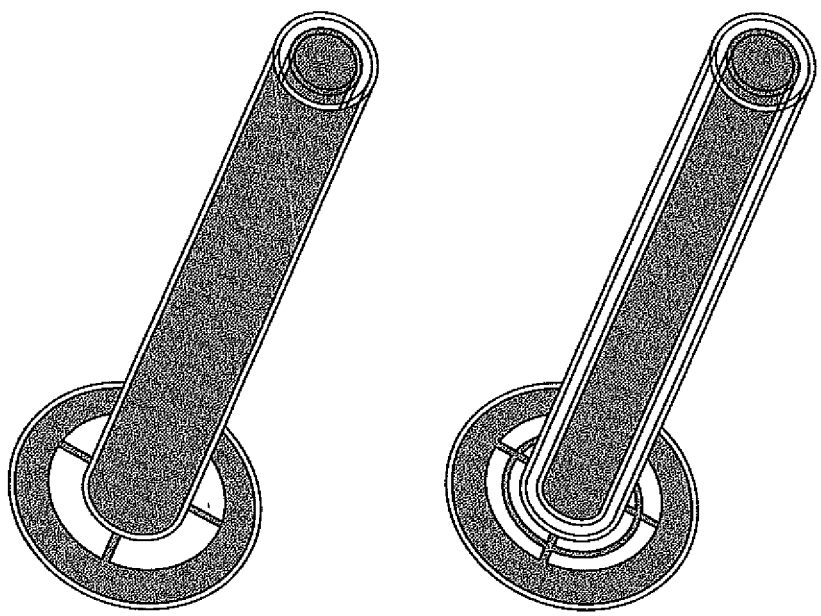
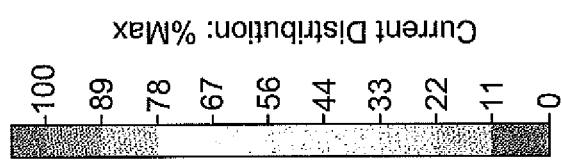
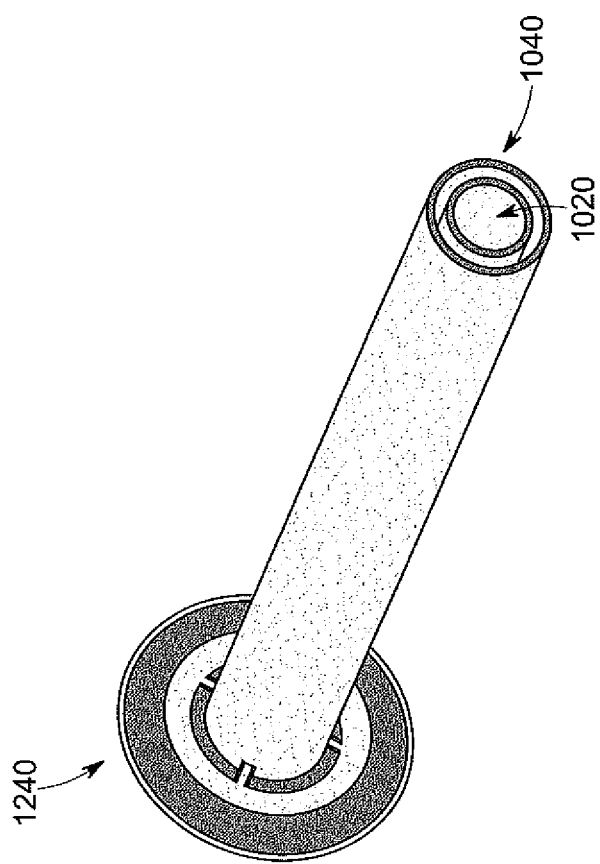
FIG. 25A
FIG. 25B

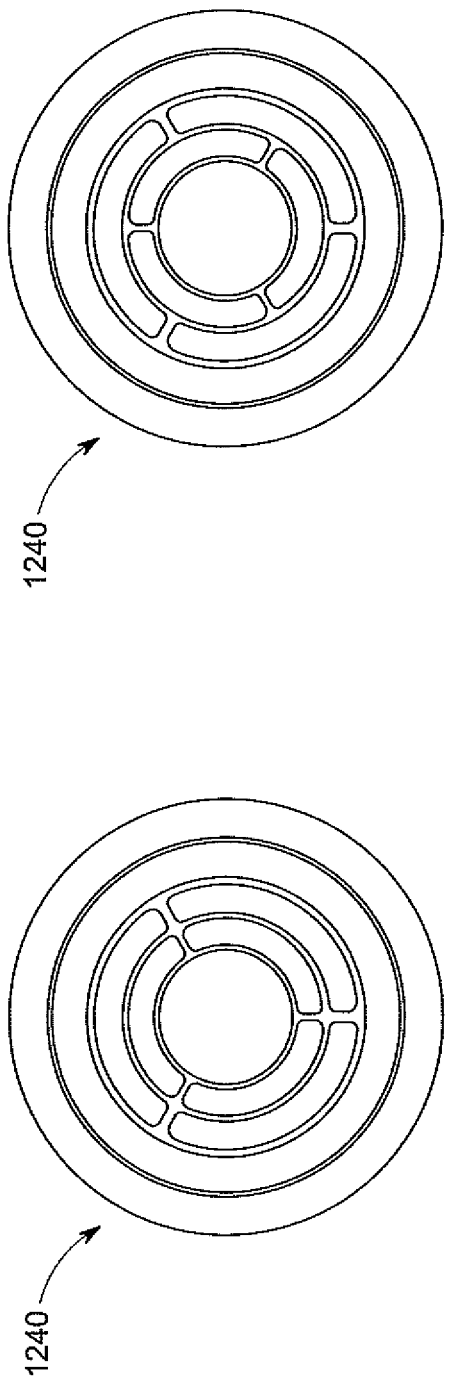
FIG. 26A
FIG. 26B
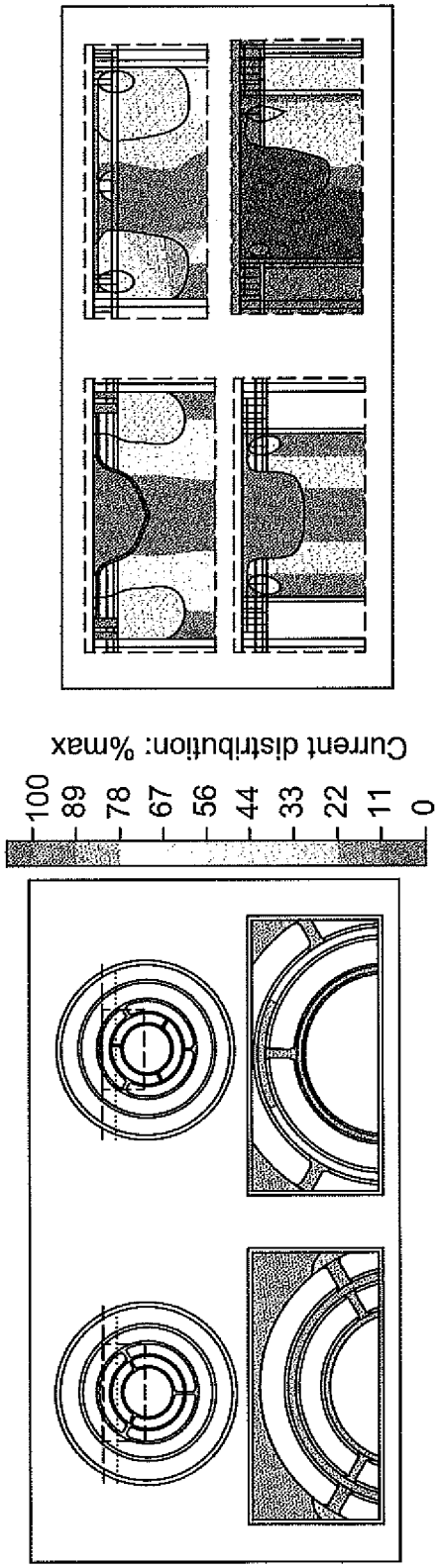
FIG. 26D
FIG 26C

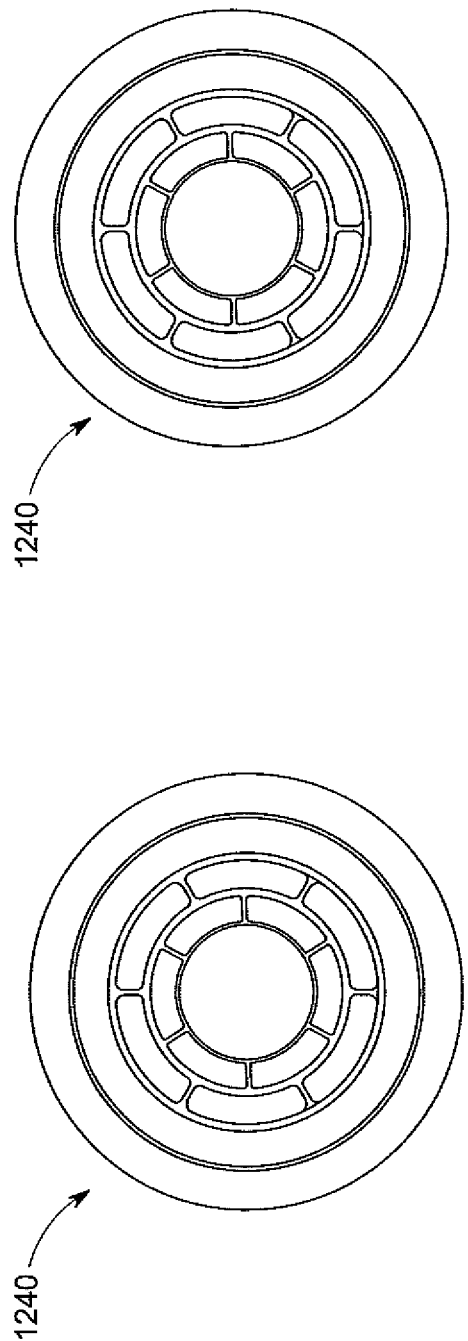
FIG. 27A
FIG. 27B
FIG. 27D
FIG. 27C

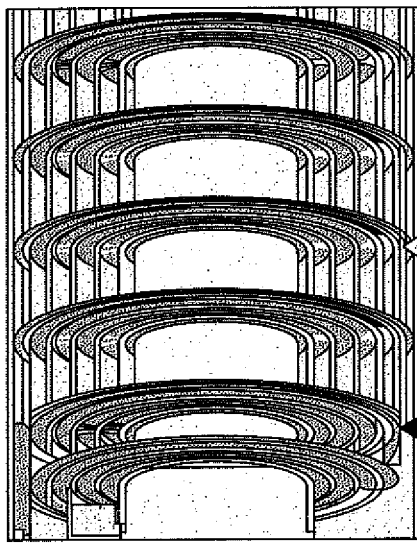
FIG. 28B
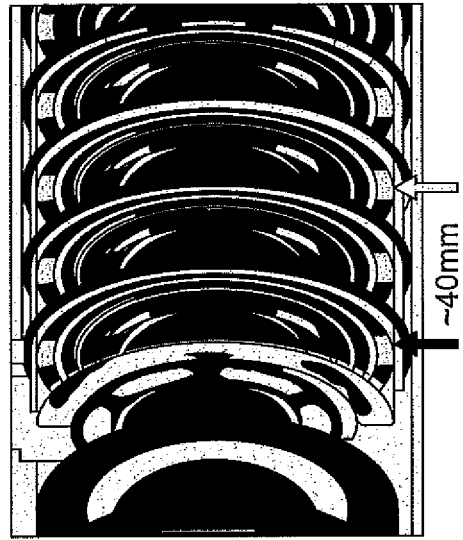
FIG. 28D
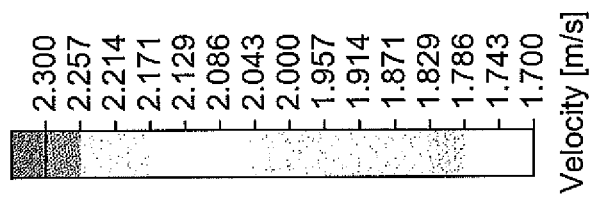
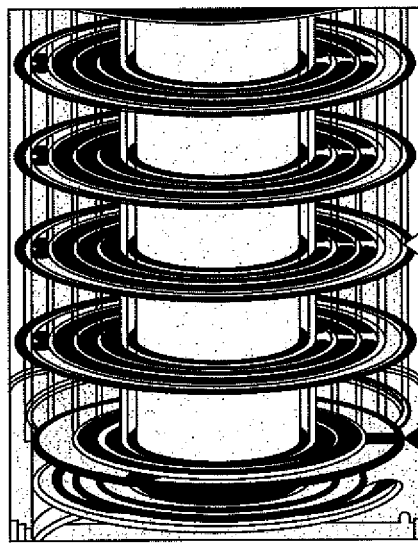
FIG. 28A
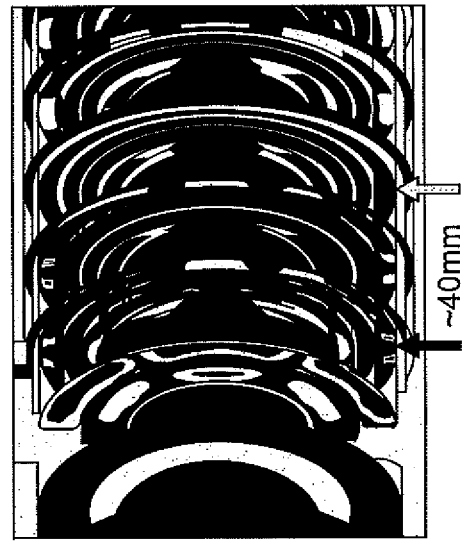
FIG. 28C

INTERNAL ELECTRICAL CONNECTIONS FOR CONCENTRIC TUBULAR ELECTROCHEMICAL CELLS

CROSS-REFERENCE TO RELATED APPLICATION

This application claims priority under 35 U.S.C. § 119(e) to U.S. Provisional Application Ser. No. 62/485,542, titled "INTERNAL ELECTRICAL CONNECTIONS FOR CONCENTRIC TUBULAR ELECTROCHEMICAL CELLS," filed on Apr. 14, 2017, which is incorporated herein by reference in its entirety for all purposes.

FIELD OF TECHNOLOGY

Aspects and embodiments disclosed herein are generally directed to electrochemical devices, and more specifically, to electrochlorination cells and devices, methods of operating same, and systems utilizing same.

SUMMARY

In accordance with one aspect, there is provided a self-cleaning electrochemical cell. The self-cleaning electrochemical cell may include a plurality of electrodes disposed concentrically in a housing about a central axis, a fluid channel defined between adjacent electrodes of the plurality of electrodes and extending substantially parallel to the central axis, and an electrical connector positioned at a distal end of at least one of the plurality of electrodes and electrically connected to the at least one of the plurality of electrodes. In some embodiments, the electrical connector may be dimensioned to allow fluid flow through the fluid channel and provide a substantially even current distribution to the at least one of the plurality of electrodes while maintaining a zone of reduced velocity having less than a predetermined length within the fluid channel downstream of the electrical connector. The zone of reduced velocity may be defined by a region in the fluid channel in which fluid flow velocity deviates from a mean fluid flow velocity in the channel by within 20%.

In some embodiments, the electrical connector has an average resistivity of less than about $7.8 \times 10^{-7}$ ohm-meter. The electrical connector may be dimensioned to generate less than about 25 W of heat when transmitting at least 100 W of power to the at least one of the plurality of electrodes. The electrical connector may be dimensioned to generate less than about 25 W of heat when transmitting at least 1 kW of power to the at least one of the plurality of electrodes.

In accordance with certain embodiments, the electrical connector may comprise a wheel and a plurality of spokes extending from the wheel. The self-cleaning electrochemical cell may further comprise a separator disposed between the adjacent electrodes, the separator comprising a feature configured to mate with the electrical connector. In some embodiments, the feature of the separator may include a slot configured to mate with a spoke of the electrical connector.

In some embodiments, each spoke of the plurality of spokes may be dimensioned to minimize electrical resistance across the electrical connector and maintain a heat generation of the electrical connector to be less than about 0.1° C. when transmitting at least 100 W of power to the at least one of the plurality of electrodes.

The plurality of spokes may be substantially evenly distributed on the wheel. In some embodiments, the spokes may have an aqualined configuration in a direction parallel to the central axis of the housing.

In accordance with certain embodiments, the self-cleaning electrochemical cell may comprise a plurality of fluid channels disposed concentrically between respective pairs of adjacent electrodes. The electrical connector may comprise a plurality of wheels and a plurality of spokes extending between adjacent wheels of the plurality of wheels. Spokes extending from adjacent wheels may be angularly offset from each other. Spokes extending from adjacent wheels may be substantially evenly offset from each other.

In accordance with another embodiment, there is provided a self-cleaning electrochemical cell comprising a plurality of electrodes, a fluid channel, and an electrical connector. The plurality of electrodes may be disposed concentrically in a housing about a central axis of the housing. The fluid channel may be defined between adjacent electrodes and extending substantially parallel to the central axis. The electrical connector may be positioned at a distal end of an electrode of the plurality of electrodes and electrically connected to the electrode. The electrical connector may be dimensioned to allow fluid flow through the channel and configured to cause a temperature of electrolyte flowing through the fluid channel at about 2 m/s and having a temperature of about 20° C. to increase by less than about 0.5° C. while transmitting at least 100 W of power to the at least one of the plurality of electrodes.

The electrical connector may include an electrical connection for connecting to an external source of power. In some embodiments, the electrical resistance of the electrical connector between the electrical connection and the electrode may be less than about $5 \times 10^{-5}$ ohms.

The electrical connector may be dimensioned to provide a substantially even current distribution to the plurality of electrodes. The electrical connector may be dimensioned to maintain a zone of reduced velocity within the fluid channel downstream of the electrical connector to be less than a predetermined length. In some embodiments, an electrolyte solution velocity deviation from mean at the predetermined length may be less than ±5% of the average flow velocity of the electrolyte solution through the fluid channel. In some embodiments, the velocity deviation from mean at the predetermined length may be less than ±2% of the average flow velocity of the electrolyte solution through the fluid channel.

In accordance with another embodiment, there is provided a system comprising a self-cleaning electrochemical cell having an inlet and an outlet in fluid communication with the fluid channel and a source of the electrolyte solution having an outlet fluidly connectable to the inlet of the self-cleaning electrochemical cell. The source of the electrolyte solution may be configured to deliver the electrolyte solution at an average flow velocity through the fluid channel of 2 m/s or greater. The self-cleaning electrochemical cell may be configured to produce a product compound from the electrolyte solution and to output a product solution comprising the product compound. The self-cleaning electrochemical cell may be fluidly connectable to a point of use through the outlet.

In some embodiments, the source of the electrolyte solution may comprise at least one of seawater, brackish water, and brine. The system may include a plurality of self-cleaning electrochemical cells arranged in series.

In accordance with another aspect, there is provided a method of operating an electrochemical system. The method may comprise providing a self-cleaning electrochemical cell, introducing an electrolyte solution into the self-cleaning electrochemical cell at an average flow velocity through the fluid channel of about 2 m/s or greater, applying a current across the plurality of electrodes at a voltage sufficient to generate a product compound from the electrolyte solution in the self-cleaning electrochemical cell, and continuously operating the electrochemical system for a predetermined period of time.

In some embodiments, the method may comprise comprising continuously operating the electrochemical system for at least 6 months. The method may comprise providing a plurality of self-cleaning electrochemical cells and fluidly connecting the plurality of self-cleaning electrochemical cells in series.

The disclosure contemplates all combinations of any one or more of the foregoing aspects and/or embodiments, as well as combinations with any one or more of the embodiments set forth in the detailed description and any examples.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2A illustrates current flow through an embodiment of a concentric tube electrochemical cell;

FIG. 7A is an isometric view of separators positioned between electrode tubes, according to one embodiment;

FIG. 7B is an elevational view of the separators and electrodes of FIG. 7A;

FIG. 7C is an isometric view of a separator, according to one embodiment;

FIG. 7D contains elevational views of the separator of FIG. 7C;

FIG. 11A is a cross-sectional view of a portion of an electrochemical cell, according to one embodiment;

FIG. 11B is an isometric view of a portion of an electrochemical cell, according to another embodiment;

FIG. 15A is a cross-sectional view of an electrochemical cell, according to one embodiment;

FIG. 15B is a contour map of outlet pressure in an outlet cap of an electrochemical cell with an outlet frustrum, according to one embodiment;

FIG. 16 is an isometric view of a portion of an electrochemical cell, according to one embodiment;

FIG. 23A is a cross-sectional view of an electrochemical cell, according to one embodiment;

FIG. 23B is a magnified view of a portion of the electrochemical cell of FIG. 23A;

FIG. 23C is an elevational view of an electrical connector of an electrochemical cell, according to one embodiment;

FIG. 23D is an isometric view of the electrical connector of FIG. 23C;

FIG. 25A is an isometric view of a portion of an electrochemical cell, according to one embodiment;

FIG. 25B includes contour maps of current distribution across the portion of the electrochemical cell of FIG. 25A;

FIG. 26A is an elevational view of an electric connection of an electrochemical cell, according to one embodiment;

FIG. 26B is an elevational view of an alternate electric connection of an electrochemical cell, according to another embodiment;

FIG. 26C is a top view contour map of current distribution around the electric connections of FIG. 26A (left) and FIG. 26B (right);

FIG. 26D is a side view contour map of current distribution around the electric connections of FIG. 26A (left) and FIG. 26B (right);

FIG. 27A is an elevational view of an electric connection of an electrochemical cell, according to one embodiment;

FIG. 27B is an elevational view of an alternate electric connection of an electrochemical cell, according to another embodiment;

FIG. 27C is a top view contour map of current distribution around the electric connections of FIG. 27A (left) and FIG. 27B (right);

FIG. 27D is a side view contour map of current distribution around the electric connections of FIG. 27A (left) and FIG. 27B (right);

FIG. 28A is a contour map of flow velocity through an electrochemical cell including the electrical connector of FIG. 26A;

FIG. 28B is a contour map of flow velocity through an electrochemical cell including the electrical connector of FIG. 26B;

FIG. 28C is a contour map of flow velocity through an electrochemical cell including the electrical connector of FIG. 27A;

FIG. 28D is a contour map of flow velocity through an electrochemical cell including the electrical connector of FIG. 27B;

DETAILED DESCRIPTION

Figure 1A:
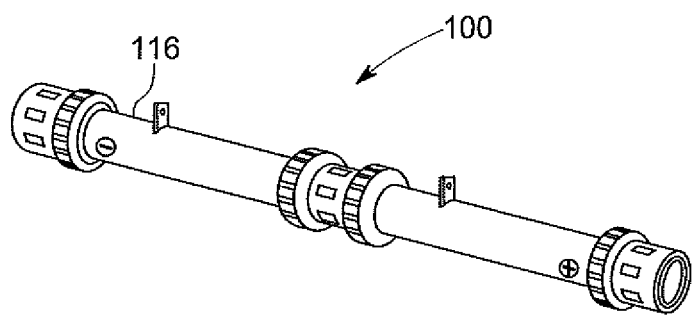
FIG. 1A is an isometric view of an embodiment of a concentric tube electrochemical cell.

Aspects and embodiments disclosed herein are not limited to the details of construction and the arrangement of components set forth in the following description or illustrated in the drawings. Aspects and embodiments disclosed herein are capable of being practiced or of being carried out in various ways. This disclosure describes various embodiments of electrochlorination cells and electrochlorination devices, however, this disclosure is not limited to electrochlorination cells or devices and the aspects and embodiments disclosed herein are applicable to electrolytic and electrochemical cells used for any one of multiple purposes.

Electrochemical devices based on chemical reactions at electrodes are widely used in industrial and municipal implementations. Examples of reactions include:

Electrochlorination with generation of sodium hypochlorite from sodium chloride and water:

| | |
|---|---|
| $2Cl^- \rightarrow Cl_2 + 2e^-$ | Reaction at anode: |
| $2Na^+ + 2H_2O + 2e^- \rightarrow 2NaOH + H_2$ | Reaction at cathode: |
| $Cl_2 + 2OH^- \rightarrow ClO^- + Cl^- + H_2O$ | In solution: |
| $NaCl + H_2O \rightarrow NaOCl + H_2$ | Overall reaction: |

Generation of sodium hydroxide and chlorine from sodium chloride and water, with a cation exchange membrane separating the anode and the cathode:

| | |
|---|---|
| $2Cl^- \rightarrow Cl_2 + 2e^-$ | Reaction at anode: |
| $2H_2O + 2e^- \rightarrow 2OH^- + H_2$ | Reaction at cathode: |
| $2NaCl + 2H_2O \rightarrow 2NaOH + Cl_2 + H_2$ | Overall reaction: |

Vanadium redox battery for energy storage, with a proton permeable membrane separating the electrodes:

During Charging:

| | |
|---|---|
| $V^{3+} + e^- \rightarrow V^{2+}$ | Reaction at 1st electrode: |
| $V^{4+} \rightarrow V^{5+} + e^-$ | Reaction at 2nd electrode: |

During Discharging:

| | |
|---|---|
| $V^{2+} \rightarrow V^{3+} + e^-$ | Reaction at 1st electrode: |
| $V^{5+} + e^- 4\ V^{4+}$ | Reaction at 2nd electrode: |

Electrochlorination cells can be used in marine, offshore, municipal, industrial and commercial implementations. The design parameters of electrochemical devices, for example, inter-electrode spacing, thickness of electrodes and coating density, electrode areas, methods of electrical connections, etc. can be optimized for different implementations.

Removal of $H_2$ gas generated at the cathodes is a major challenge in the design of electrochemical devices and of the overall system. The gas must be safely vented at either selected locations in the piping or at product tanks. In some embodiments, an oxidant may be introduced to mitigate $H_2$ gas generation, optionally by generating $H_2O_2$.

Aspects and embodiments disclosed herein are generally directed to electrochemical devices to generate disinfectants such as sodium hypochlorite. The terms "electrochemical device" and "electrochemical cell" and grammatical variations thereof are to be understood to encompass "electrochlorination devices" and "electrochlorination cells" and grammatical variations thereof.

Figure 1B:
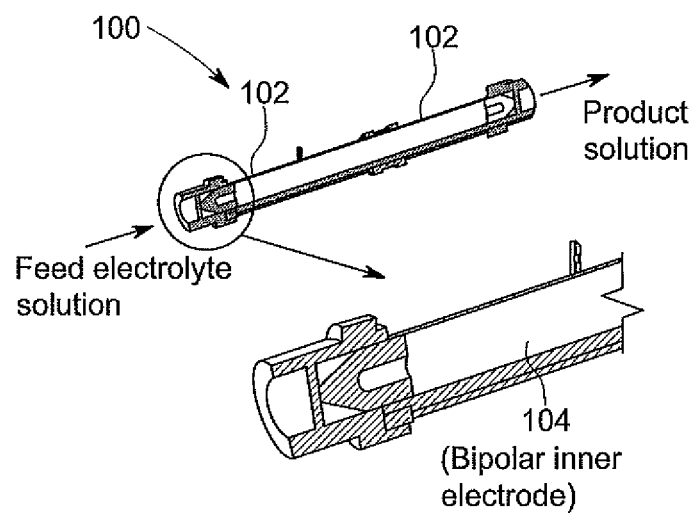
FIG. 1B is a cross-sectional view of the concentric tube electrochemical cell of FIG. 1A.

As disclosed herein, aspects and embodiments relate to concentric tubular electrochemical cells (CTE). FIG. 1A shows an exemplary electrochemical cell 100 with concentric tubes disposed within a housing 116. The inner surface of the outer tube and the outer surface of the inner tube include the active electrode areas. As seen in FIG. 1B, feed electrolyte solution flows between concentric tubes 102, 104 through a length of the electrochemical cell 100. A flow channel is created by a gap between concentric tubes, as shown in FIG. 1D.

The gap between the electrodes in this exemplary embodiment is approximately 3.5 mm. For certain applications (for example, marine and offshore applications) with seawater as feed, the liquid velocity through the fluid channel can be greater than 2.0 m/s, for example, on the order of 2.1 m/s, up to 3 m/s, up to 3.5 m/s, up to 6 m/s, or up to 10 m/s, resulting in highly turbulent flow which reduces the potential for fouling and scaling on the electrode surfaces.

Figure 1C:
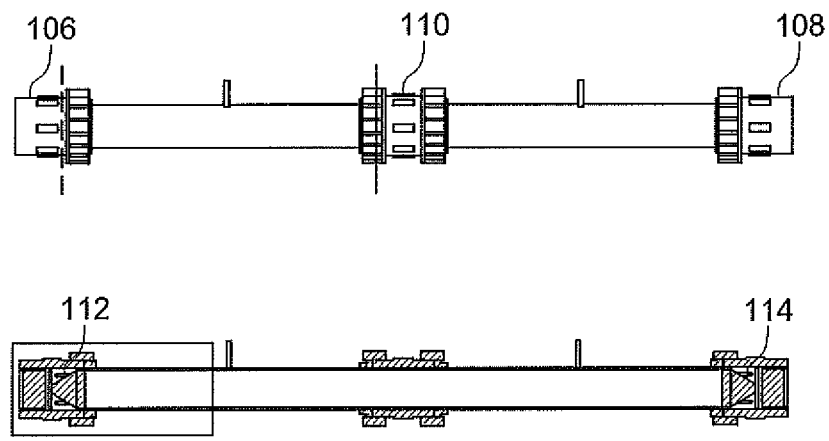
FIG. 1C includes an elevational view and a cross-sectional view of the concentric tube electrochemical cell of FIG. 1A.
Figure 1D:
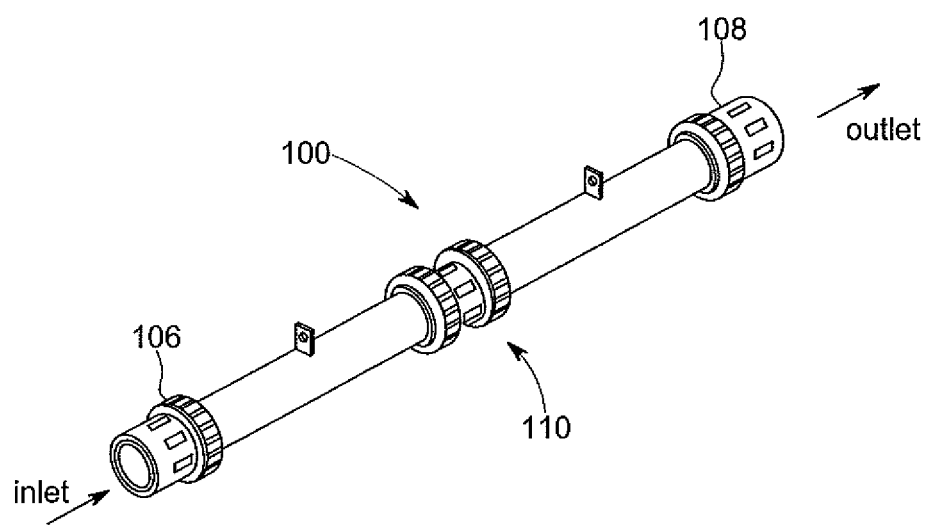
FIG. 1D is an alternate isometric view of the concentric tube electrochemical cell of FIG. 1A.

The electrochemical cell 100 can include end caps 106, 108 and a center cap 110 as shown in FIG. 1C. The electrochemical cell can include cones 112, 114 as shown in FIGS. 1B and 1C. Cones 112, 114 may be provided on the inner electrode to direct feed electrolyte solution towards the gap between concentric tubes 102, 104. Separators (alignment features) may be positioned at one or more of the inlet, outlet, and center caps to maintain an internal position of the concentric tubes and define the gap. End caps, cones, and separators have an impact on flow velocity and pressure drop through the electrochemical cell. Decreasing flow velocity can increase the potential for fouling and scaling, resulting in a greater need for maintenance. In systems with multiple electrochemical cells arranged in series, the pressure drop across each electrochemical cell has a cumulative effect on the system. According to certain embodiments disclosed herein, one or more features may be designed to reduce the impact on flow velocity and pressure drop within the electrochemical cell. Additionally, one or more features may be designed to simplify fabrication of electrochemical cells and their components. As disclosed herein, features may be designed by mathematical function or freely generated. In some embodiments, features may be empirically generated or designed using Computational Fluid Dynamics (CFD) software.

Aspects and embodiments disclosed herein are described as including one or more electrodes. The term "metal electrodes" or grammatical variations thereof as used herein is to be understood to encompass electrodes formed from, comprising, or consisting of one or more metals, for example, titanium, aluminum or nickel although the term "metal electrode" does not exclude electrodes including of consisting of other metals or alloys. In some embodiments, a "metal electrode" may include multiple layers of different metals. Metal electrodes utilized in any one or more of the embodiments disclosed herein may include a core of a high-conductivity metal, for example, copper or aluminum, coated with a metal or metal oxide having a high resistance to chemical attack by electrolyte solutions, for example, a layer of titanium, platinum, a mixed metal oxide (MMO), magnetite, ferrite, cobalt spinel, tantalum, palladium, iridium, silver, gold, or other coating materials.

"Metal electrodes" may be coated with an oxidation resistant coating, for example, but not limited to, platinum, a mixed metal oxide (MMO), magnetite, ferrite, cobalt spinel, tantalum, palladium, iridium, silver, gold, or other coating materials. Mixed metal oxides utilized in embodiments disclosed herein may include an oxide or oxides of one or more of ruthenium, rhodium, tantalum (optionally alloyed with antimony and/or manganese), titanium, iridium, zinc, tin, antimony, a titanium-nickel alloy, a titanium-copper alloy, a titanium-iron alloy, a titanium-cobalt alloy, or other appropriate metals or alloys. Anodes utilized in embodiments disclosed herein may be coated with platinum and/or an oxide or oxides of one or more of iridium, ruthenium, tin, rhodium, or tantalum (optionally alloyed with antimony and/or manganese). Cathodes utilized in embodiments disclosed herein may be coated with platinum and/or an oxide or oxides of one or more of iridium, ruthenium, and titanium. In some embodiments, both the anode and cathode are coated similarly to allow for periodic polarity reversal of the electrodes. Electrodes utilized in embodiments disclosed herein may include a base of one or more of titanium, tantalum, zirconium, niobium, tungsten, and/or silicon. Electrodes for any of the electrochemical cells disclosed herein can be formed as or from plates, sheets, foils, extrusions, and/or sinters.

The term "tube" as used herein includes cylindrical conduits, however, does not exclude conduits having other cross-sectional geometries, for example, conduits having square, rectangular, oval, or obround geometries or cross-sectional geometries shaped as any regular or irregular polygon.

The terms "concentric tubes" or "concentric spirals" as used herein includes tubes or interleaved spirals sharing a substantially common central axis, but does not exclude tubes or interleaved spirals surrounding a substantially common axis that is not necessarily central to each of the concentric tubes or interleaved spirals in a set of concentric tubes or interleaved spirals.

In accordance with an aspect, an electrochemical cell includes concentric tube electrodes. At least some of the concentric tube electrodes may be mono-polar or bipolar. The inner tube electrode may be an anode having an oxidation resistant coating, for example, platinum or MMO. The outer tube electrode may have no coating, acting as a cathode. Alternatively, the inner tube electrode may act as a cathode and the outer tube electrode may act as an anode. In some embodiments, both electrodes are coated to allow for polarity reversal.

The electrodes in the exemplary embodiment may be mono-polar such that current passes through the electrolyte once per electrode. Each of the electrodes may include a titanium tube. The anode electrical connector may be in electrical communication with the outer tube electrode. The cathode electrical connector may be in electrical communication with the inner tube electrode. If there is a middle tube electrode, it may be in electrical communication with the inner tube electrode, outer tube electrode, or both. In some embodiments, the middle tube electrode may be an anode having an oxidation resistant coating, for example, platinum or MMO, on both the inner and outer surface to make full use of the surface. The middle tube anode may be surrounded by two electrodes acting as cathodes.

Figure 2B:
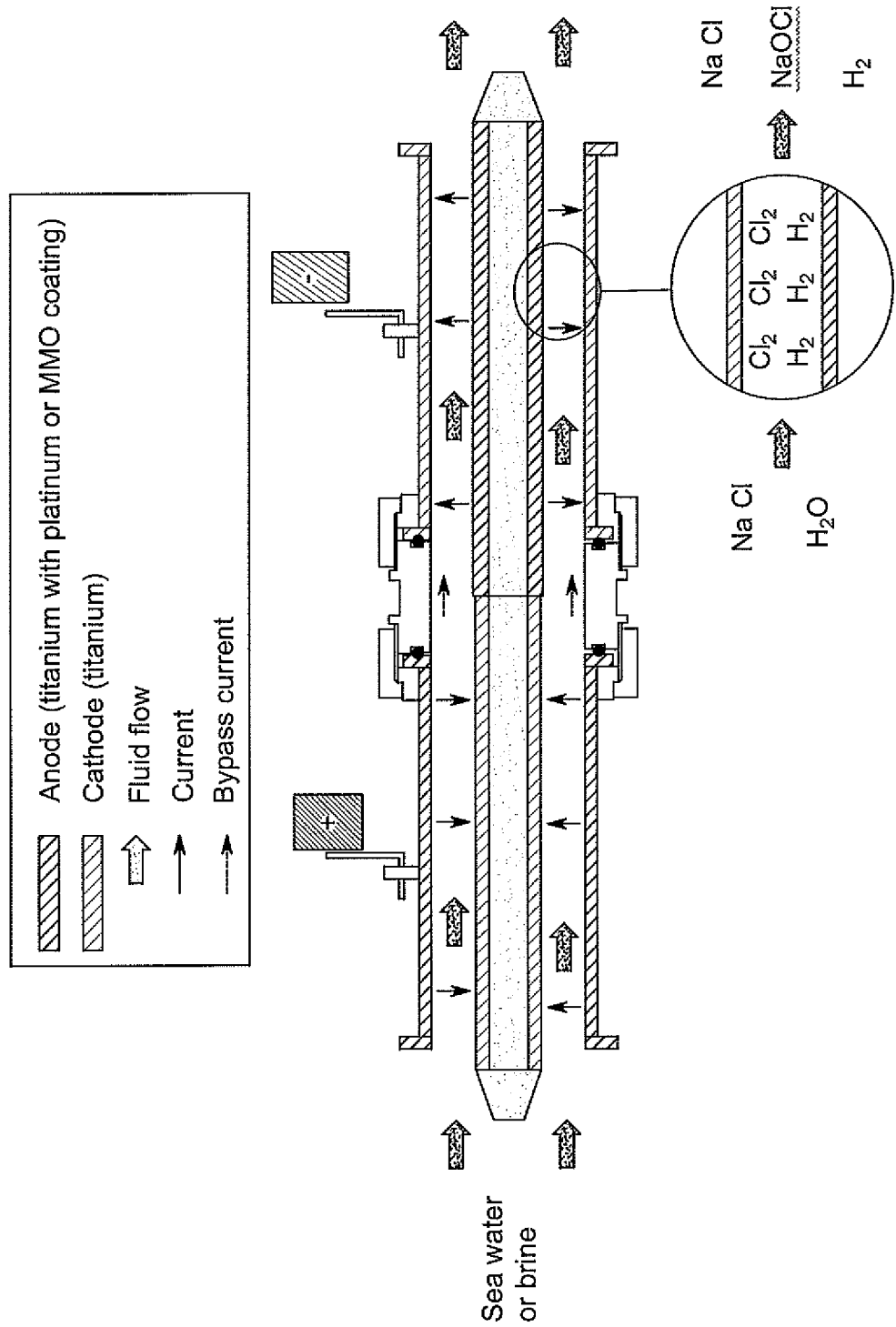
FIG. 2B illustrates current flow through another embodiment of a concentric tube electrochemical cell.

FIGS. 2A-2D show some possible exemplary arrangements of electrodes in a CTE electrochemical cell. FIG. 2A illustrates an exemplary arrangement in which current flows in one pass from the anode to the cathode. Both electrodes may be fabricated from titanium, with the anode coated with platinum or a mixed metal oxide (MMO). Such electrodes are called "mono-polar."

The electrodes in the exemplary embodiment may be bipolar such that current passes through the electrolyte more than once per electrode. In an exemplary embodiment, one end of a bipolar tube electrode (in some embodiments about one half of the electrode) may be uncoated to function as a cathode and the other end portion (in some embodiments about one half of the electrode) may be coated with an oxidation resistant coating, for example, platinum or MMO, to function as an anode. The bipolar tube electrode may be nested within the anode and cathode tube electrodes, each tube electrode surrounding one end portion of the bipolar electrode. An anode tube electrode and a cathode tube electrode having a common diameter may be laterally displaced along a length of the electrochemical cell. The bipolar tube electrode may be oriented to enable current to flow in two passes through electrolyte solution passing between the bipolar tube electrode, the anode tube electrode, and the cathode tube electrode.

By inserting additional bipolar tube electrodes and overlapping respective anode tube electrodes and cathode tube electrodes such that anode and cathode tube electrodes are provided on alternative sides of a plurality of bipolar tube electrodes along an axial direction through the electrochemical cell, the cell can be assembled to provide three or more current passes, schematically similar to the multi-pass parallel plate electrode (PPE).

FIG. 2B illustrates an exemplary arrangement in which current flows in two passes through the device with two outer electrodes and one inner electrode. One of the outer electrodes is coated on the inside surface, for example, to serve as an anode; the other is uncoated. A portion of the outer surface of the inner electrode is coated, for example, to also serve as an anode, and the remaining portion is uncoated. Current flows through the electrolyte from the coated outer electrode to the uncoated portion of the inner electrode, along the inner electrode to the coated portion, then finally back across the electrolyte to the uncoated outer electrode. The inner electrode is also called a "bipolar" electrode.

Figure 2C:
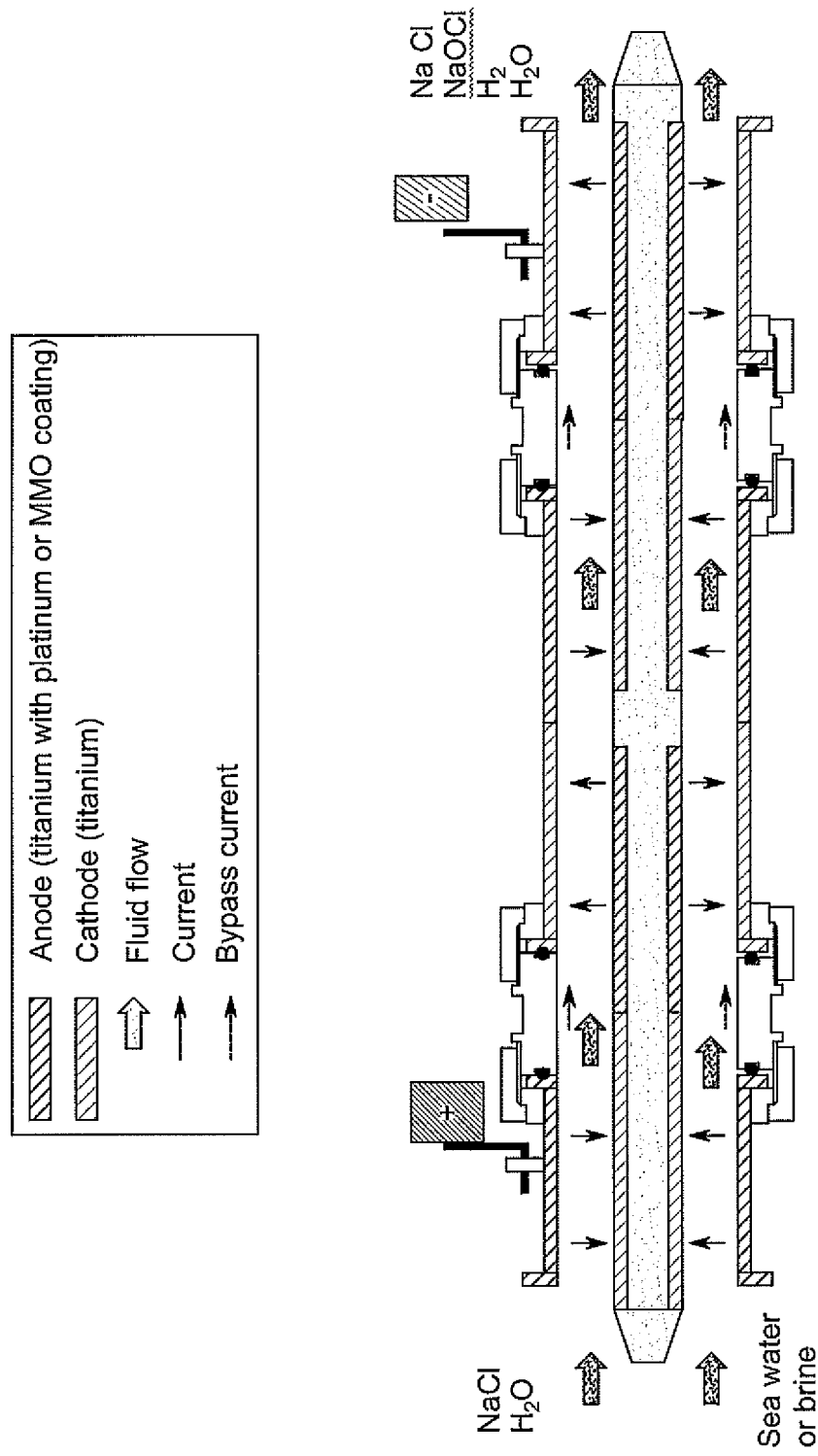
FIG. 2C illustrates current flow through another embodiment of a concentric tube electrochemical cell.

FIG. 2C illustrates an arrangement in which current flows in multiple passes through the device with multiple outer electrodes and one inner electrode. By alternating cathode and anode portions and coating the electrodes where necessary, current can flow back and forth through the electrolyte in multiple passes. The number of passes can be scaled up accordingly.

In accordance with an aspect, an electrochemical cell includes a plurality of concentric tube electrodes. In embodiments disclosed herein including multiple anode or cathode tube electrodes, the multiple anode tube electrodes may be referred to collectively as the anode or the anode tube, and the multiple cathode tube electrodes may be referred to collectively as the cathode or the cathode tube. In embodiments including multiple anode and/or multiple cathode tube electrodes, the multiple anode tube electrodes and/or multiple cathode tube electrodes may be collectively referred to herein as an anode-cathode pair.

The electrochemical cell can include, for example, three, four, or five concentric tubes. In some embodiments, the electrochemical cell may include three or four concentric tube electrodes, with two outer tube electrodes and one or two inner tube electrodes. A four tube electrochemical cell may work in a similar way to a three tube electrochemical cell, except that an electrolyte solution may flow through three fluid channels instead of two. The extra electrode tube may provide an additional cathode electrode surface, anode electrode surface, and fluid channel. Similarly, an electrochemical cell including five tube electrodes may include two outer tubes, three inner tubes, and four fluid channels. The fifth electrode tube may provide yet an additional cathode electrode surface, anode electrode surface, and fluid channel. The number of tubes, the number of passes, and the electrode configuration (mono-polar or bipolar) may vary. The number of tubes, number of passes, and electrode configuration may be selected based on the desired use of the electrochemical cell.

Multi-tube electrode arrangements as disclosed herein progressively increase active area per unit volume. With increasing number of multi-tubes used in electrochemical or electrochlorination cells and devices including multiple concentric tube electrodes, the innermost tube diameter will become increasingly smaller with less active surface area per tube. However, the overall result is the multi-tube electrode will have significantly more active surface when compared to other CTE electrode devices.

As the term is used herein, an "active density" of an electrochemical cell is defined as the ratio of the cross-sectional area between active or functional electrode surfaces (surfaces of the electrodes from or to which current contributing to electrochemical treatment of a fluid in the electrochemical cell flows) through which fluid undergoing treatment in the electrochemical cell may flow (an "active area" of the electrochemical cell) to a total cross-sectional area within a housing of the electrochemical cell. "Active density," as defined, is the area in a plane normal to the center axis through which fluid can flow divided by the total cross-sectional area normal to the center axis. The unit of measure is dimensionless, a fraction or a percentage. Aspects and embodiments disclosed herein include electrochemical cells having active densities of between about 46% and about 52%, greater than about 50%, in some embodiments, greater than about 75%, in some embodiments, greater than 85%, in some embodiments, greater than 90%, and in some embodiments up to about 95%.

As the term is used herein an "overall packing density" of an electrochemical cell is defined as total functional electrode path length in a plane normal to flow of fluid through an electrochemical cell respective to a total cross-sectional area within a housing of the electrochemical cell. "Packing density" is the "active surface area" of the electrodes in an electrochemical device divided by the total internal volume of the device. The unit of measure is 1/length (e.g. $m^{-1}$). An "active surface area" of an electrode is the surface area of the electrode from which or into which current that contributes to electrochemical reactions within an electrochemical device flows. An electrode having opposing surfaces may have active surface area on a single surface or on both surfaces. An "anodic packing density" is the "active surface area" of the anode(s) in an electrochemical device divided by the total internal volume of the device. A "cathodic packing density" is the "active surface area" of the cathode(s) in an electrochemical device divided by the total internal volume of the device. An "overall electrode packing density" or "total electrode packing density" is the sum of the anodic packing density and cathodic packing density of an electrochemical device. Aspects and embodiments of electrochemical cells disclosed herein may have anodic packing densities, cathodic packing densities, and/or overall electrode packing densities of 2 $mm^{-1}$ or more.

In accordance with certain embodiments, the anode and/or cathode tubes of an electrochemical cell may have apertures to allow hydrogen generated in electrochemical reactions to flow through the electrodes more easily and reduce hydrogen masking effects at the electrode surface(s). Hydrogen masking reduces available anode area and subsequently sodium hypochlorite output. Additionally or alternatively the anode(s) and/or cathode(s) may include a fluid permeable and/or perforated or mesh material, for example, perforated titanium or a titanium mesh. The electrochemical cell may include a gas conduit for oxidant delivery to combine with hydrogen produced by, for example, electrochlorination reactions, in the cell and produce water or hydrogen peroxide. In some embodiments, a catalyst is provided, for example, on and/or in the cathodes to facilitate reaction of the oxidant and hydrogen in the cell.

The surface area of the electrodes may be increased through the use of corrugations. The electrochemical cell may include one of anodes or cathodes that are corrugated, while the other of the anodes or cathodes are non-corrugated. The electrochemical cell may include a multi-channel corrugated electrode geometry. In other embodiments, the anodes and cathodes may have different forms of curvature than illustrated to provide increased electrode surface area. However, it should be noted that corrugations may increase turbulence, correspondingly decreasing average flow velocity through the electrochemical cell. Thus, corrugated electrode cells may require an increased inlet flow velocity to compensate.

Surface area for hydrogen abatement at or in cathodes may be increased through the use of multiple gas diffusion cathodes per anode. The multiple gas diffusion cathodes may be supplied with gas (oxidant), for example, oxygen, through axial or parallel gas conduits.

Aspects and embodiments of electrochemical cells disclosed herein may include anodes and cathodes (or anode-cathode pairs) that are configured and arranged to direct substantially all or all fluid passing through active areas or gaps between the anodes and cathodes in a direction substantially or completely parallel to a central axis of a housing. In some embodiments, the gaps may be referred to as fluid channels. The fluid channels may have a length of between 0.5 m and 2.0 m, for example, about 1.0 m. In some embodiments, the fluid channels may extend at least 3.0 m. The direction substantially or completely parallel through the active areas may be parallel or substantially parallel to the anodes and cathodes (or anode-cathode pairs). Fluid flowing through the active areas may still be considered flowing in the direction substantially or completely parallel through the active areas even if the fluid flow exhibits turbulence and/or vortices during flow through the active areas.

Figure 3A:
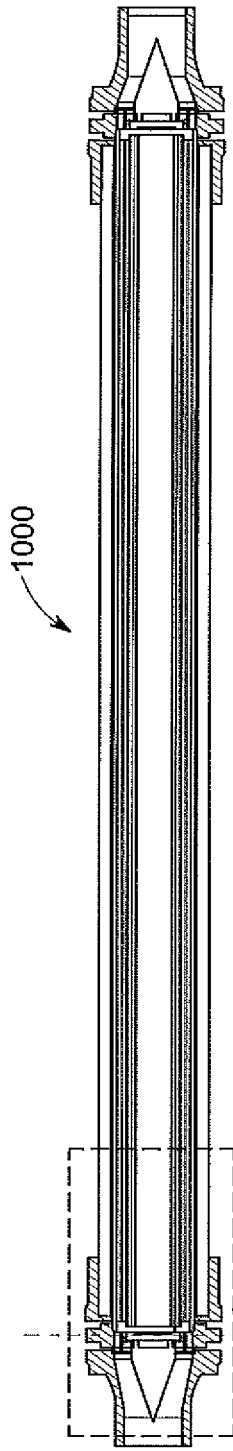
FIG. 3A is a cross-sectional view of an electrochemical cell, according to one embodiment.
Figure 3C:
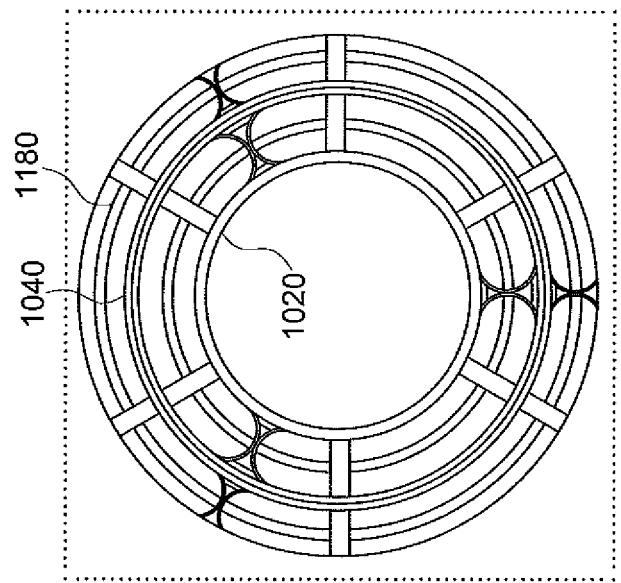
FIG. 3C is a cross-sectional view of the exemplary electrochemical cell of FIG. 3A.
Figure 3B:
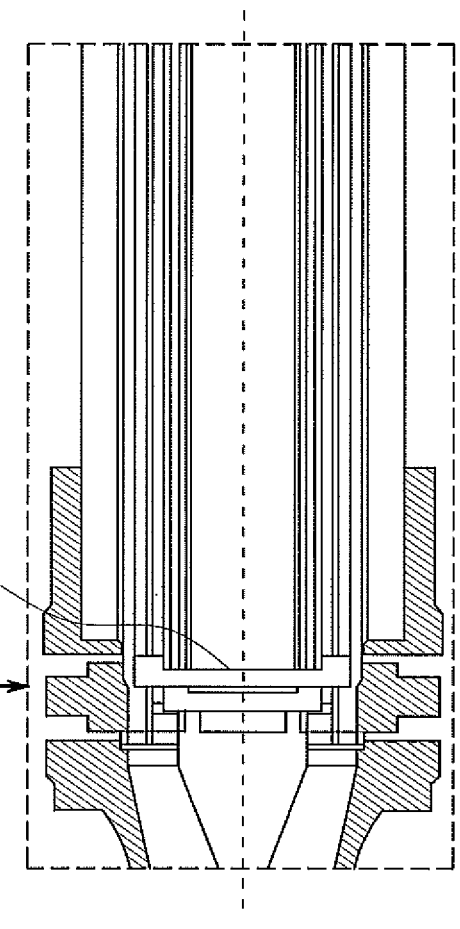
FIG. 3B is a magnified cross-sectional view of a portion of the electrochemical cell of FIG. 3A.

In some aspects and embodiments of electrochemical cells including concentric tube electrodes, for example, one or more anodes and/or cathodes as disclosed herein, the electrodes are configured and arranged to direct fluid through one or more gaps between the electrodes in a direction parallel to a central axis of the electrochemical cell (shown as a dotted line in FIG. 3B). In some aspects and embodiments, the electrodes are configured and arranged to direct all fluid introduced into the electrochemical cell through the one or more gaps between the electrodes in a direction parallel to a central axis of the electrochemical cell.

The width of the gaps between the electrodes may be constant or variable. The width of the gaps between the electrodes may be, for example, between about 1 mm and about 7 mm across, between about 1 mm and about 5 mm across, or between about 3 mm and about 5 mm across. In some embodiments, the width of the gap between electrodes may be about 2.0 mm, about 2.5 mm, about 3.0 mm, about 3.5 mm, or about 4.0 mm. The width of the gap and electrochemical cell design may be selected based on a type of electrolyte to be treated in the electrochemical cell.

In an exemplary embodiment, a feed electrolyte solution flows through the two annular gaps (i.e. fluid channels) formed between the three tube electrodes. A DC voltage, constant or variable, or in some embodiments, an AC current, may be applied across the anode and cathode electrical connectors. The current may flow from the inner and outer surfaces of the anode (middle tube electrode) simultaneously to the inner and outer cathodes (inner tube electrode and outer tube electrode). Electrical connection may be made between tube electrodes by one or more conductive bridges, which may be formed of the same material as the electrode, for example, titanium. Electrochemical and chemical reactions may occur at the surfaces of the electrodes and in the bulk solution to generate a product solution. For example, electrochemical and chemical reactions may occur at the surfaces of the electrodes and in the bulk solution to generate a product solution in the fluid channels formed between the tube electrodes.

Electrochemical systems may generally be fed brine, brackish water, or seawater, although the feed solution is not limiting. Design parameters of the electrochemical cell may generally be selected based on the composition of the feed solution and/or desired composition of a product solution. Seawater generally has a salinity of between about 3.0% and 4.0%, for example, seawater may have a salinity of about 3.5%, 3.6%, or 3.7%. Seawater comprises dissolved ions including sodium, chloride, magnesium, sulfate, and calcium. Seawater may further include one or more of sulfur, potassium, bromide, carbon, and vanadium. Seawater may have a total dissolved solids (TDS) content of about 35,000 mg/l. Brine generally has a salinity of greater than about 3.5%. For example, brine may have a salinity of about 4.0%, 4.5%, 5.0%, 7.5%, or about 10%. Brine may have a TDS content of greater than about 35,000 mg/l. Saturated brine may have a salinity of up to about 25.0%. Brackish water generally has a salinity of less than 3.5%. Brackish water may have a salinity of about 3.0%, 2.5%, 2.0%, or 1.0%. Brackish water may have a TDS content of less than about 35,000 mg/l. For example, brackish water may have a TDS content between about 1,000 mg/l to about 10,000 mg/l.

In general, the conductivity of the electrolyte solution may be between about 0 and 25 S/cm, as dependent on the salinity. Brackish water having a salinity between about 0.5% and 2.0% may have a conductivity of between about 0.5 S/cm and about 4.0 S/cm, for example, about 0.8 S/cm or about 3.0 S/cm. Seawater having a salinity of about 3.5% may have a conductivity of between about 4.5 S/cm and 5.5 S/cm, for example, about 5.0 S/cm or about 4.8 S/cm. Brine having a salinity between about 5.0% and 10% may have a conductivity of between about 7 S/cm and 13.0 S/cm, for example, about 12.6 S/cm. Saturated brine having a salinity of about 25% may have a conductivity of between about 20.0 S/cm and about 23.0 S/cm, for example, about 22.2 S/cm. Salinity and conductivity may follow the linear relationship: $y=0.9132x+1.6332$, where y is conductivity (S/cm) and x is percent salinity (% NaCl).

Scaling and fouling may generally occur in regions of low velocity within the electrochemical cell. Conventionally, acid washing may be required to remove scaling. Acid washing requires the electrochemical cell to be taken offline, limiting production and use. As disclosed herein, components of the electrochemical cell may be designed to reduce regions of low velocity, reducing scaling and fouling. The average fluid velocity required to maintain self-cleaning properties may be dependent on the qualities of the electrolyte solution. As used herein, the self-cleaning fluid velocity is the average bulk fluid velocity by which scale formation may be substantially minimized. The self-cleaning fluid velocity may be selected to minimize, limit, or substantially reduce scale formation in the electrochemical cell. Maintaining a self-cleaning fluid velocity and/or minimizing any zones of reduced velocity can substantially reduce or eliminate the need for acid washing of the device. Thus, the device can be maintained in continuous use for much longer periods of time, generally until an electrode or its coating degrades.

Typically, to maintain the self-cleaning nature of electrochemical cells, for example, electrochemical cells employed to treat seawater, the bulk fluid velocity may be maintained above an average velocity of 2 m/s. For example, seawater or water having a magnesium concentration of about 1000-1400 ppm and a calcium concentration of about 300-450 ppm at room temperature (20-25° C.) may require an average flow velocity of about 2 m/s or greater to maintain self-cleaning properties. Seawater or water having greater hardness, for example up to about 500 ppm Ca and 1800 ppm Mg (water from the Red Sea) may require a greater average flow velocity to maintain self-cleaning properties. Such seawater may require an average flow velocity of about 2.5 m/s or 3.0 m/s to maintain self-cleaning properties. Seawater or water having less hardness, for example, about 200 ppm Ca and about 700 ppm Mg (water from the Arabian Gulf) may maintain self-cleaning properties with a lower average flow velocity. For example, such seawater may maintain self-cleaning properties at an average flow velocity of about 1.5 m/s or 1.8 m/s.

Seawater having a temperature greater than about 20° C. or 25° C. (for example, water from the Arabian Gulf which may have a temperature of about 40° C.) or having a temperature less than about 20° C. or 25° C. (for example, water from the North Sea which may have a temperature of about 0° C.) may also maintain self-cleaning properties with a lower or greater average flow velocity, respectively. Additionally, brackish water and brine may maintain self-cleaning properties with lower average flow velocities.

Average flow velocity may be maintained as required to maintain self-cleaning properties of the electrochemical cell. For instance, flow velocity may be maintained at greater than about 1.5 m/s, between about 1.5 m/s and about 2 m/s, greater than about 2 m/s, between about 2 m/s and about 2.5 m/s, greater than about 2.5 m/s, between about 2.5 m/s and 3.0 m/s, or greater than about 3.5 m/s as required to maintain self-cleaning properties with the particular electrolyte solution. For certain feed streams, flow velocity may be maintained at or near 4 m/s, 5 m/s, 6 m/s, 7 m/s, 8 m/s, 9 m/s, or 10 m/s. Any average velocity below the self-cleaning velocity may be resolved within a predetermined length, as described in more detail below.

In some embodiments disclosed herein, the electrodes, e.g., a cathode and an anode, may be disposed concentrically in a housing about a central axis of the housing. The electrodes can be inserted into a non-metallic housing and connected to a source of DC or AC power by waterproof connectors so that no electrically live components are exposed to the outside environment. This design is generally safer for the operators and there is no risk of short-circuit between the devices and an external grounded component or liquid.

The electrodes may be positioned inside a non-metallic housing, designed to electrically isolate the electrodes from the outside environment and to withstand the fluid pressure of electrolyte passing through the electrochemical cell. The housing may be non-conductive, chemically non-reactive to electrolyte solutions, and have sufficient strength to withstand system pressures, system high-frequency vibrations, and environmental low-frequency vibrations (for example, onboard a ship). The housing may have sufficient strength to withstand up to 16 Bar pressure. The housing may have sufficient strength to withstand an electrolyte solution flow rate of up to 10 m/s. The housing may comprise one or more of polyvinyl chloride (PVC), polytetrafluoroethylene (PTFE), polyvinylidene fluoride (PVDF), acrylonitrile butadiene styrene (ABS), high-density polyethylene (HDPE), fiber reinforced polymer (FRP), or other appropriate materials, and in some embodiments may include reinforcing elements, for example, glass or carbon fibers embedded in a polymer matrix. Electrode connectors may extend outside the walls of the housing at an end of the housing. In some embodiments, the electrode connectors may extend outside the walls of the housing at opposite ends of the housing.

As shown in FIGS. 3A-3C, the electrochemical cell 1000 may contain one or more separators 1180 configured to maintain the gap between electrodes 1020 and 1040. The separators 1180 may be positioned to reside between the electrodes 1020 and 1040 (as shown in FIG. 3C), e.g., between a cathode and an anode. To maintain the fluid channel (shown in FIG. 3C between electrodes 1020 and 1040), the separators 1180 may be dimensioned to have a height which maintains the width of the gap between the electrodes 1020 and 1040, localizing the electrodes 1020 and 1040 and maintaining concentricity of the tubes (as shown in FIG. 3B). The separators 1180 may be dimensioned to allow fluid flow through the channel.

FIGS. 7A-7B show another embodiment of separators 1180. As shown in FIG. 7A, each separator 1180 may be constructed and arranged to attach to the end of an electrode tube 1020, 1040. The separators may be positioned within electrode tubes 1020, 1040 as shown in FIG. 7B. The separator 1180 may contain one or more features 1186 that mate with an electrode or electrical connector. As used herein, "mate" refers to a connection between two or more elements. The connection may be mechanical and/or electrical. The mating feature may be used to maintain alignment and prevent rotation of the separator relative to the electrode or electrical connector. The molded features 1186, as shown in FIGS. 7C-7D may facilitate assembly of the electrochemical cell by reducing the need for other attachment elements. In some embodiments, the separator may comprise a slot, clamp, or integral attachment feature configured to mate with an electrode tube and maintain concentricity of concentric electrode tubes.

The separator may be constructed from a chemically-inert, non-conductive material capable of withstanding high pressure. In some embodiments, the separator may be constructed to withstand up to 16 Bar pressure, system high-frequency vibrations, and environmental low-frequency vibrations (for example, onboard a ship). The separator may be constructed to withstand an electrolyte solution flow rate of up to 10 m/s. The separator may be constructed from plastic or ceramic. The separator may comprise one or more of PVC, PTFE, PVDF, ABS, HDPE, FRP, or other appropriate materials. In some embodiments, the separator may be injection molded for ease of manufacturing and assembly.

Figure 4:
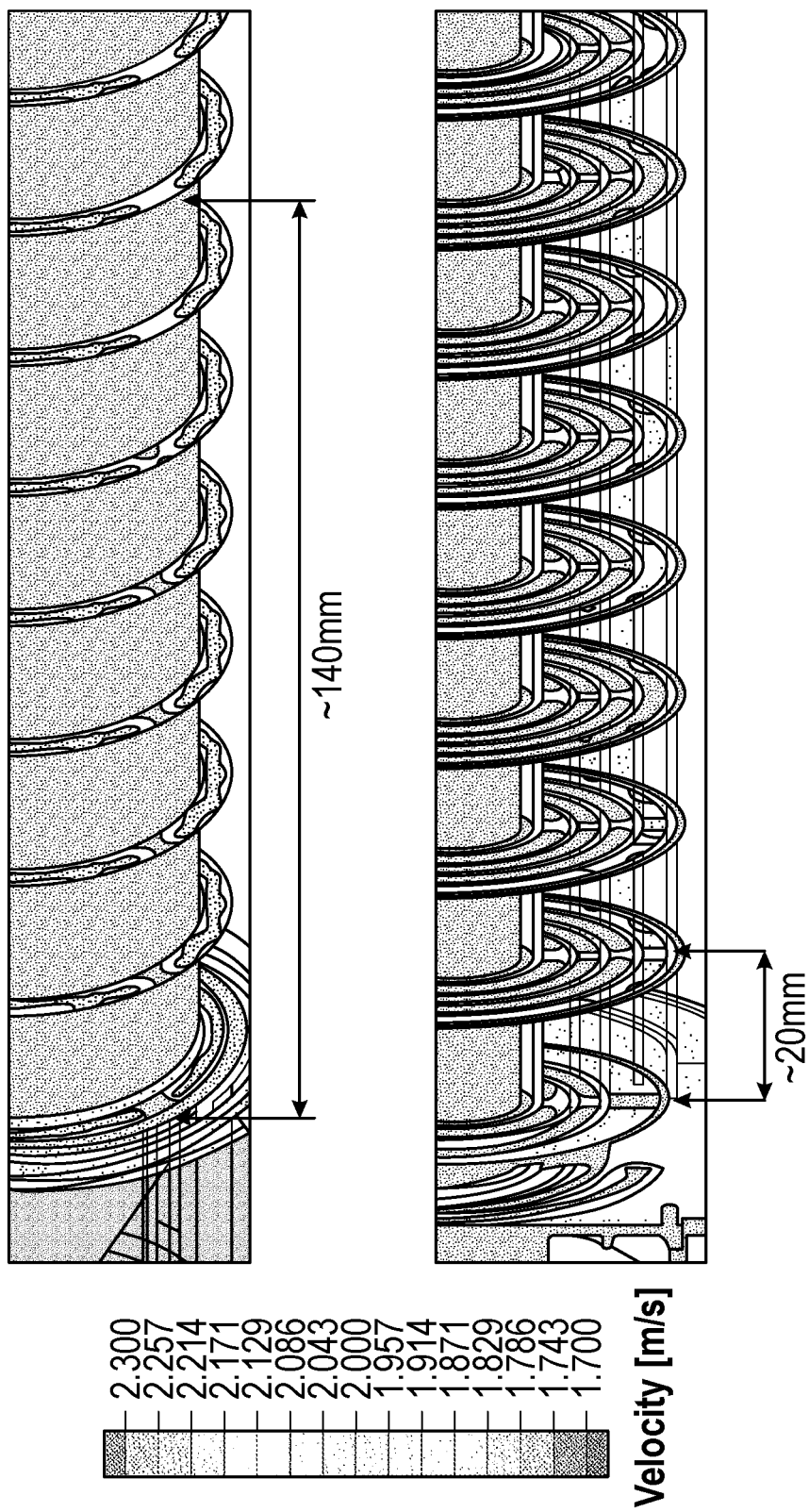
FIG. 4 is a contour map of the velocity profile down a fluid channel of an electrochemical cell, according to some embodiments.
Figure 5:
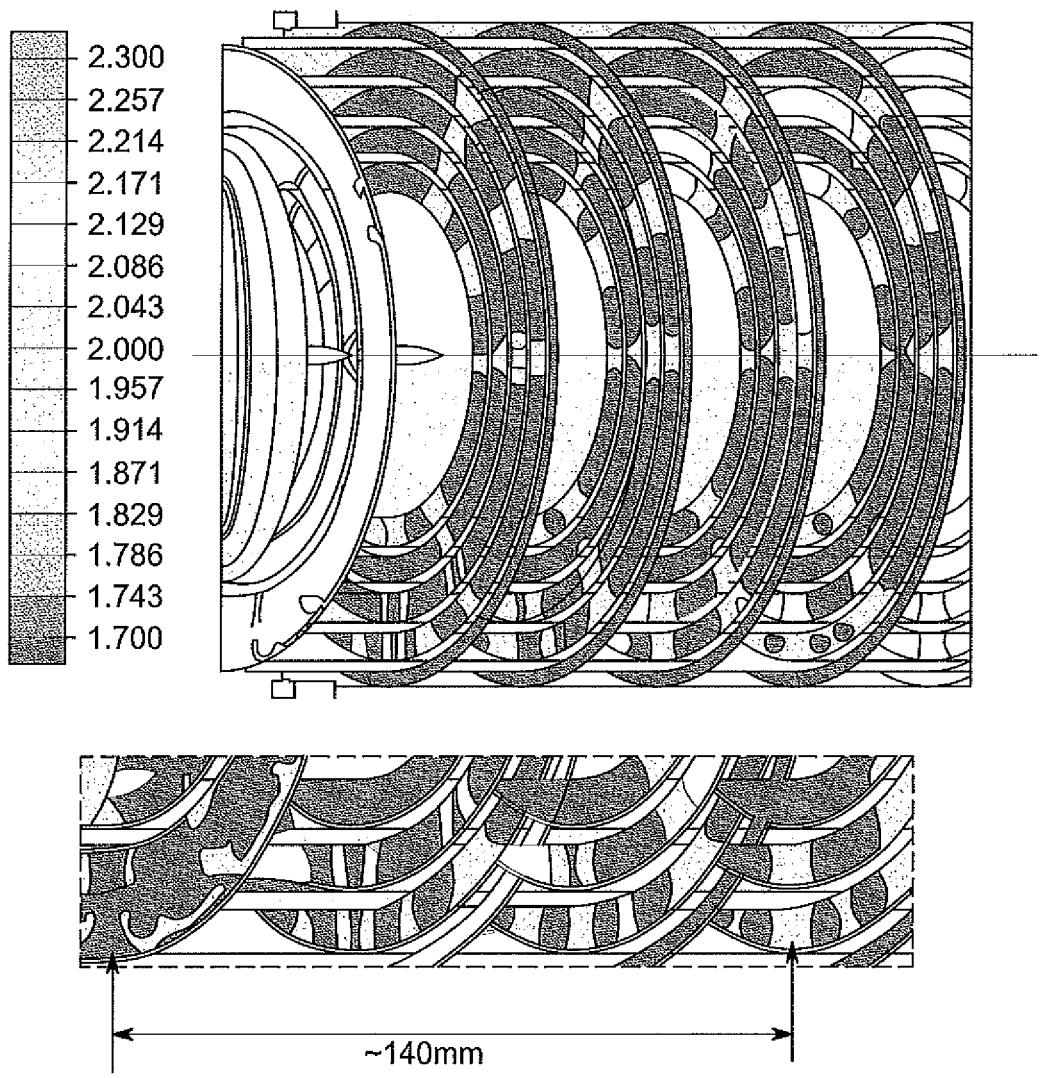
FIG. 5 is a contour map of the velocity profile down a fluid channel of an electrochemical cell, according to an alternate embodiment.

Flow features such as separators tend to create drag on the flowing electrolyte solution, resulting in an area of reduced velocity (also described herein as a "zone of reduced velocity") downstream from the separator. As previously described, a decrease in average flow velocity may compromise the self-cleaning nature of an electrochemical cell. Thus, any average velocity below the self-cleaning velocity should be resolved within a predetermined length down the fluid channel from the separator. A self-cleaning electrochemical cell with no separator may resolve a zone of reduced velocity, for example, within 20 mm from the inlet of the electrochemical cell. In some exemplary embodiments, self-cleaning properties are met when the zone of reduced velocity is resolved within 140 mm from the separator, as shown in FIG. 4. According to some embodiments, the separator may be dimensioned to resolve the zone of reduced velocity within 20 mm (FIG. 4) or within 60 mm (FIG. 5).

The zone of reduced velocity may be defined by an area in which the electrolyte solution flow velocity is lower than the average flow velocity of the solution through the channel or the self-cleaning velocity. The zone of reduced velocity resulting from the separator is generally located downstream of the separator, but other zones of reduced velocity may exist within the electrochemical cell. In some embodiments, the zone of reduced velocity is defined by an area in which an average electrolyte solution flow velocity is at least 2%, 5%, 10%, 15%, 20%, or 25% less than the self-cleaning velocity or the average velocity through the fluid channel. For an exemplary electrochemical cell having a self-cleaning or average flow velocity of at least 2 m/s, the zone of reduced velocity may be defined by any flow velocity lower than 2 m/s, by a flow velocity at least 25% lower than 2 m/s (for example, 1.5 m/s), by a flow velocity at least 20% lower than 2 m/s (for example, 1.6 m/s), by a flow velocity at least 15% lower than 2 m/s (for example, 1.7 m/s), by a flow velocity at least 10% lower than 2 m/s (for example, 1.8 m/s), by a flow velocity at least 5% lower than 2 m/s (for example, 1.9 m/s), by a flow velocity at least 2% lower than 2 m/s (for example, 1.96 m/s), or by a flow velocity at least any other percentage lower than 2 m/s.

For any average flow velocity within the zone of reduced velocity, the zone may end when the fluid velocity resolves to an average bulk velocity equal to the self-cleaning fluid velocity or equal to the average fluid velocity within the electrochemical cell. For example, the zone of reduced velocity may have a given velocity profile which resolves when the average fluid velocity reaches 2 m/s (or any other desired self-cleaning velocity). In some embodiments, the zone of reduced velocity ends when the average fluid velocity reaches a velocity within 1%, 2%, 5%, or 10% of the self-cleaning velocity or the average velocity within the electrochemical cell. Thus, for an exemplary electrochemical cell having a self-cleaning velocity of 2 m/s, the zone of reduced velocity may end when the average fluid velocity resolves to 2 m/s, 1.98 m/s (within 1%), 1.96 m/s (within 2%), 1.9 m/s (within 5%), or 1.8 m/s (within 10%). In some embodiments, the zone of reduced velocity ends when the average fluid velocity resolves to the inlet fluid velocity, for example, the fluid velocity upstream from the separator. The zone of reduced velocity may end when the average fluid velocity resolves to a fluid velocity within 1%, 2%, 5%, or 10% of the inlet fluid velocity.

Figure 22:
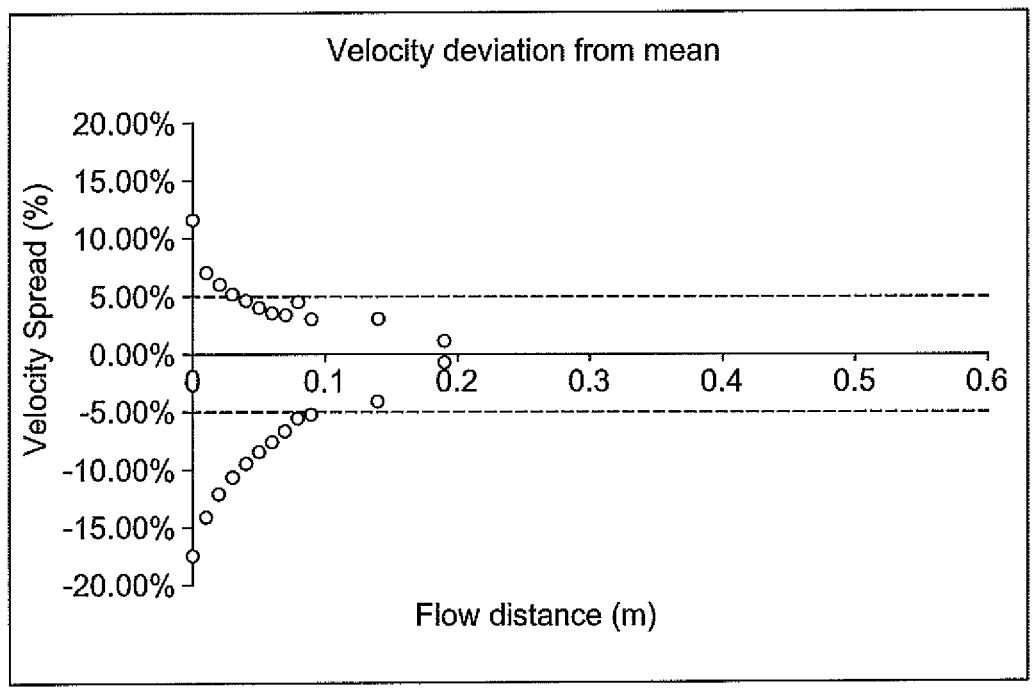
FIG. 22 is a graph of velocity deviation from mean downstream from a separator, according to one embodiment.

The zone of reduced velocity may also be characterized by a velocity deviation from the mean flow velocity of the bulk electrolyte solution through the electrochemical cell. The velocity spread within the zone of reduced velocity is generally greatest at the boundary of the zone of reduced velocity and the separator (i.e., immediately downstream from the separator). The velocity spread tends to normalize downstream, until it is within a percentage from the mean flow velocity of the electrochemical cell. In an exemplary embodiment, the velocity spread follows the curve of the graph of FIG. 22. In some embodiments, the velocity deviation within the zone of reduced velocity does not exceed ±20%, for example, does not exceed ±18%, does not exceed ±15%, of the mean flow velocity. The zone of reduced velocity may terminate when the velocity spread is within ±5%, within ±2%, within ±1% of the mean flow velocity. Since the mean flow velocity is, by definition, an average velocity, it is conceivable that the velocity spread may remain within a small percentage from the self-cleaning velocity throughout the length of the electrochemical cell.

The separator may be designed to minimize the zone of reduced velocity which naturally occurs in the fluid channel downstream of the separator. The zone of reduced velocity is minimized to maintain the self-cleaning properties of the electrochemical cell. The separator may be dimensioned to maintain the zone of reduced velocity within a predetermined length. Generally, the predetermined length of the zone of reduced velocity may be selected to minimize or eliminate scaling based on the average flow velocity through the fluid channel and/or the composition of the electrolyte solution. The predetermined length can be, for example, between about 2% and 5%, for example, less than about 5% of a length of the fluid channel. In some embodiments, the predetermined length is about 5%, 4%, 3%, 2%, or less than 1% of the fluid channel. Certain electrolyte solutions may tolerate a greater predetermined length than others. Composition, hardness, and temperature of the electrolyte solution may play a role in determining the tolerance of the electrochemical cell for scaling.

In some embodiments, the predetermined length is described in relation to a width of the flow channel. For instance, the ratio of the length of the zone of reduced velocity to the width of the fluid channel may be less than 120 to 3.5. This ratio corresponds to a zone of reduced velocity having a length of less than 120 mm for a channel width of 3.5 mm, a length of less than 102.8 mm for a channel width of 3.0 mm, a length of less than 85.7 mm for a channel width of 2.5 mm, and so forth. The ratio of the length of the zone of reduced velocity to the width of the fluid channel may be less than 100 to 3.5, 60 to 3.5, or 20 to 3.5. In some embodiments, the predetermined length may be within 140 mm, 120 mm, 100 mm, 60 mm, or 20 mm for an electrolyte solution flowing through the fluid channel at an average flow velocity of between 2.0 m/s and 2.5 m/s, for example, 2.0 m/s, 2.1 m/s, 2.2 m/s, 2.3 m/s, 2.4 m/s, or 2.5 m/s.

In some embodiments, the separator is designed to minimize the zone of reduced velocity by allowing only a predetermined flow area through the channel. The separator may be dimensioned to have a cross-sectional area that covers a predetermined percentage of a flow area of the fluid channel. For instance, the separator may be dimensioned to have a cross-sectional area between 10% and 35% of the flow area of the fluid channel. The separator may be dimensioned to have a cross-sectional area less than about 10%, 15%, 20%, 25%, 30%, or 35% of the flow area of the fluid channel. In general, the separator may be designed to have a cross-sectional area that is as small as possible (i.e., allowing the greatest solution flow) while supporting the fluid channel. The cross-sectional area of the separator may be designed to provide adequate support to the electrode tubes to maintain concentricity, while reducing the zone of reduced velocity that occurs downstream from the separator to maintain the self-cleaning properties of the electrochemical cell.

The separator may be designed to maintain an electrolyte solution velocity deviation from mean to be within ±20%, for example, ±18%, or ±15%, of an average flow velocity of the electrolyte solution through the fluid channel. The separator may be dimensioned to minimize the velocity deviation from mean downstream from the separator. For example, the separator may minimize the velocity deviation from mean immediately adjacent to the separator. In some embodiments, the separator may be aqualined to minimize the velocity deviation from mean. As described herein, "aqualined" may refer to a component having a streamlined configuration against a flow of solution. Aqualined may comprise configurations which form minimal downstream velocity deviations from mean. In some embodiments, aqualined configurations do not or substantially do not form eddies downstream. Aqualined configurations need not be limited to providing laminar flow and may be surrounded by turbulent flow. In some embodiments, aqualined configurations do not substantially contribute to turbulence in the flow of electrolyte through the electrochemical cell.

Figure 6B:
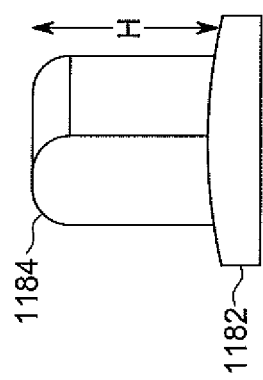
FIG. 6B is an elevational view of a projection on a separator, according to one embodiment.
Figure 6D:
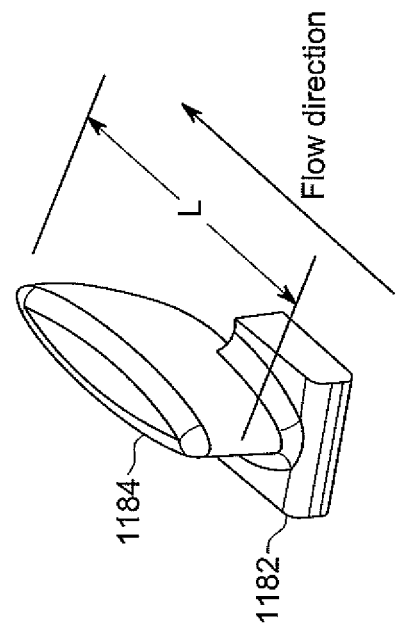
FIG. 6D is an isometric view of a projection on a separator, according to one embodiment.
Figure 6A:
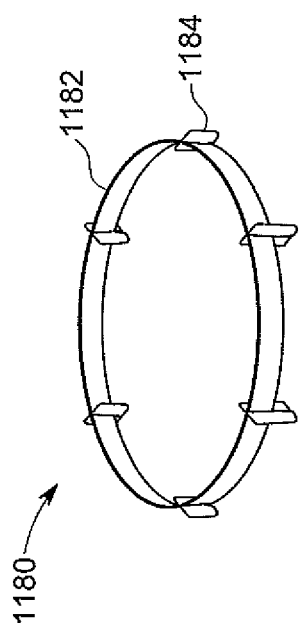
FIG. 6A is an isometric view of a separator, according to one embodiment.
Figure 6C:
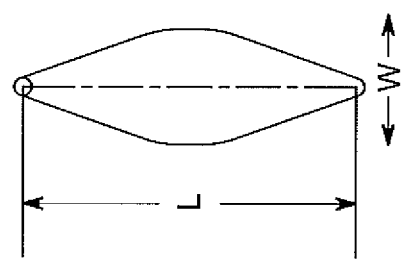
FIG. 6C is a plan view of a projection on a separator, according to one embodiment.

In accordance with certain embodiments, as shown in FIG. 6A, the separator may comprise a ring 1182 and a plurality of projections 1184 extending from the ring 1182. The separator may allow fluid flow between the projections 1182 (for example, as shown in FIG. 3C). The feature 1186 provided for alignment of the separator may be positioned on the ring 1182, for example, between adjacent projections. The projections 1184 may be provided to maintain the gap between the electrode tubes, while allowing fluid flow through the channel. Thus, the projections may be dimensioned to have a height which maintains the width of the fluid channel. As shown in FIGS. 6B-6D, H is the height of the projection essentially equivalent to the width of the fluid channel, W is a width of the projection, and L is a length of the projection down the fluid channel. The projections 1184 may be attached to the ring 1182 on one end and extend radially outward from the ring or radially inward from the ring. In embodiments where projections extend radially outward and radially inward from the ring, as shown in FIG. 6A, the height may be essentially equivalent to half the width of the fluid channel.

Typically, the projections may have a length L (defined in a direction down the flow channel), as shown in FIGS. 6C and 6D, that is greater than the width W. Additionally, the projections may have a streamlined or aqualined configuration to reduce drag on the flowing electrolyte. In some embodiments, the projections may be spherical, cylindrical, ovoid, teardrop shaped, almond shaped, diamond shaped (elongated or symmetrical), or a rounded triangle. The projections may have a circular, oval, triangular, diamond, or teardrop cross-sectional shape.

The separator may generally have sufficient projections to provide support for the electrode tubes. In some embodiments, the separator may have between 2 and 8 projections, for example, between 3 and 6 projections. The separators may have, for example, 3, 4, 5, or 6 projections. The dimensions of the ring and projections may be designed to reduce the zone of reduced velocity. For instance, the number and arrangement of projections may be selected to minimize the zone of reduce velocity or otherwise maintain the zone of reduced velocity within the predetermined length. Accordingly, the separator may have a number and width of projections that result in a separator cross-sectional area between 10% and 35% of the flow area of the fluid channel. In some embodiments, the projections may be substantially evenly spaced apart on the ring to provide even support (for example, as shown in FIG. 6A). Similarly, the length and width of projections may be selected to minimize the zone of reduced velocity or otherwise maintain the zone of reduced velocity within the predetermined length. The projections may be dimensioned to have a width that provides sufficient structural support for the electrodes (for example, based on the number of projections) while not substantially exceeding a width that would provide too much drag. For certain materials, the projections may have a minimum width capable of manufacture that also provides adequate support. In some embodiments, the projections may be dimensioned to have a width that is between 0.5 and 2 times the height, for example, between 0.5 and 1 times the height or between 1 and 2 times the height.

A typical electrochlorination cell may have a channel width of between 1 and 5 mm. Such an electrochemical cell may contain a separator having a ring width of between 0.5 and 3 mm, projections having a height of between 1 and 5 mm (corresponding with the channel width), projections having a width of between 1 and 10 mm, and projections having a length of between 1 and 10 mm. An exemplary electrochemical cell may have a channel width of 3.0 mm to 3.5 mm. Such an electrochemical cell may include a ring having a width of 1 mm and projections having a width of 2.5 to 7 mm and a length of 5 to 10 mm, where the length is not shorter than the width. The ring may be substantially centrally located in the fluid channel, with projections extending in both directions from the ring. The height of projections in this exemplary ring may be measured from end to end. In some embodiments, the ring may be positioned against one of the electrodes, with projections extending in substantially one direction toward the opposite electrode.

As previously described, the electrochemical cell can include a plurality of concentric tube electrodes, for example, three, four, or five concentric tube electrodes. With each added concentric tube electrode, an additional cathode electrode surface, an additional anode electrode surface, and an additional fluid channel are provided. Each fluid channel may be defined between each adjacent cathode and anode, and each fluid channel may extend substantially parallel to the other fluid channels and a central axis of the housing. Each fluid channel may additionally be associated with a separator residing between the electrodes to maintain the fluid channel. Thus, the electrochemical cell may comprise a plurality of concentric separators residing between concentric electrodes.

Figure 17A:
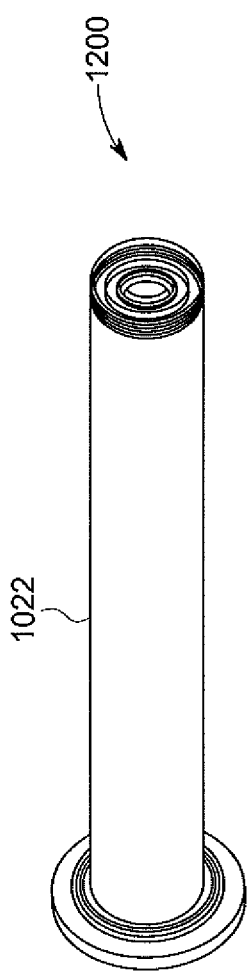
FIG. 17A is an isometric view of a portion of an electrochemical cell, according to one embodiment.
Figure 17B:
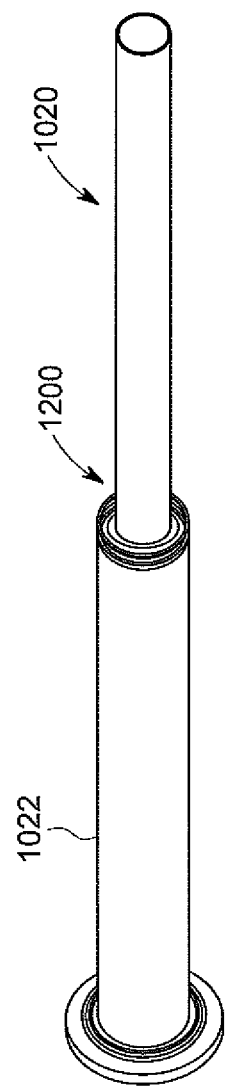
FIG. 17B is an isometric view of another portion of the electrochemical cell of FIG. 17A.
Figure 17C:
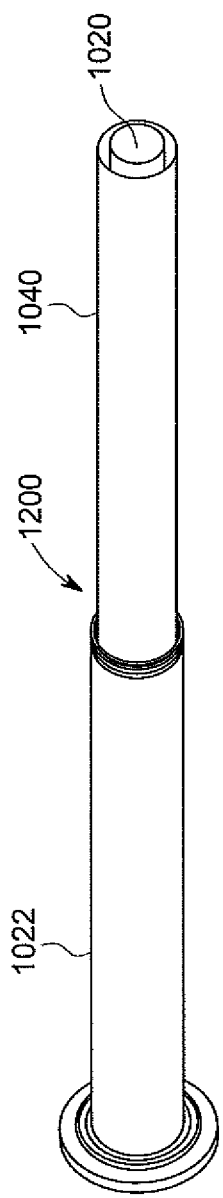
FIG. 17C is an isometric view of another portion of the electrochemical cell of FIG. 17A.
Figure 18A:
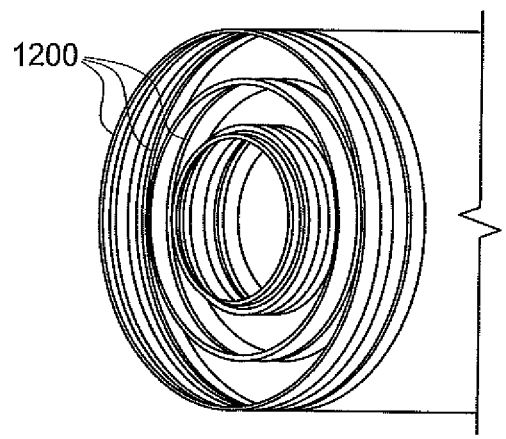
FIG. 18A is an isometric view of a portion of an electrochemical cell, according to one embodiment.
Figure 18B:
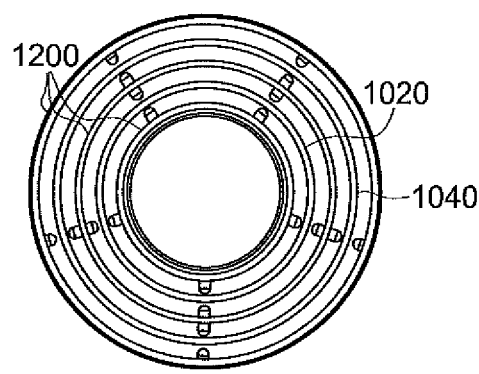
FIG. 18B is a plan view of the portion of the electrochemical cell of FIG. 18A.

In some embodiments, for example, as shown in FIG. 16, the electrochemical cell 1000 may comprise a plurality of consecutive electrodes 1020, 1022. The consecutive electrodes 1020, 1022 may be arranged down a length of the housing (not shown in FIG. 16). As shown in FIGS. 17A-17C, the electrochemical cell 1000 may include one or more separators 1200 positioned between consecutive electrodes 1020, 1022. The separators 1200 may be positioned, arranged and configured to mate with the consecutive electrodes 1020, 1022 (for example, through a feature such as a slot, clamp, or electrical connection), locating the electrodes within the electrochemical cell 1000. Additionally, where concentric 1020, 1040 and consecutive 1020, 1022 electrodes are present, a plurality of concentric separators 1200 may be positioned between consecutive electrodes 1020, 1022 and configured to maintain concentricity of the consecutive electrodes, for example, as shown in FIGS. 18A and 18B.

Figure 19A:
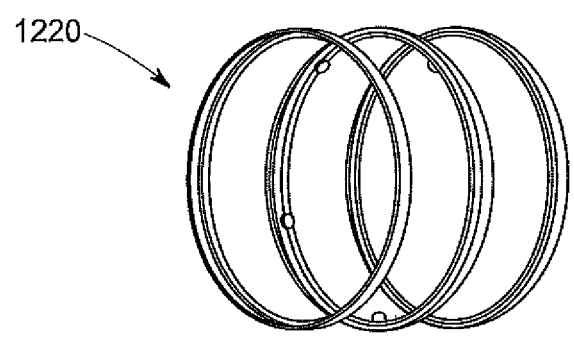
FIG. 19A is an exploded view of a separator, according to one embodiment.
Figure 19B:
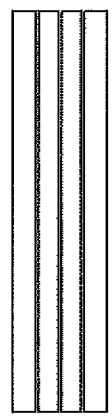
FIG. 19B is a plan view of the separator of FIG. 19A.
Figure 19C:
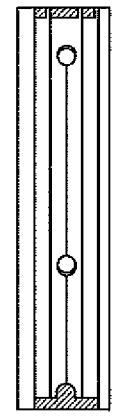
FIG. 19C is a cross-section view of the separator of FIG. 19A.
Figure 20A:
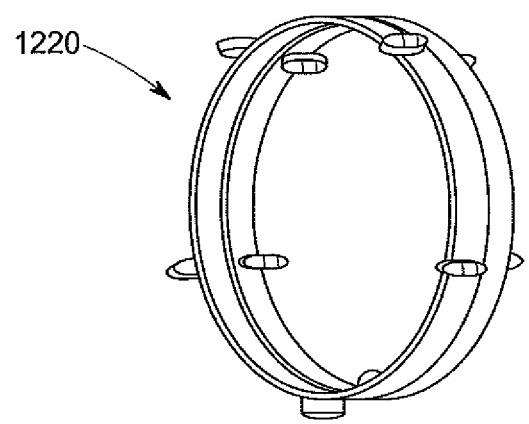
FIG. 20A is an isometric view of a portion of a separator, according to one embodiment.
Figure 20B:
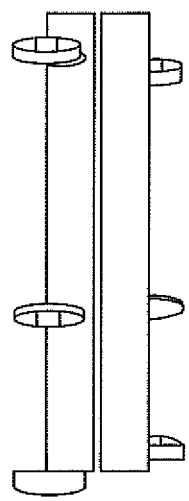
FIG. 20B is an elevational view of the separator of FIG. 20A.
Figure 20C:
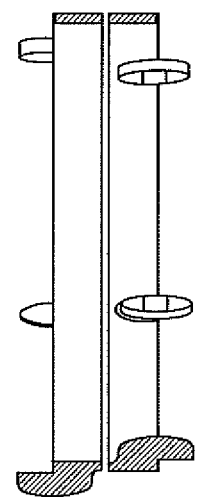
FIG. 20C is a cross-section view of the separator of FIG. 20A.
Figure 21A:
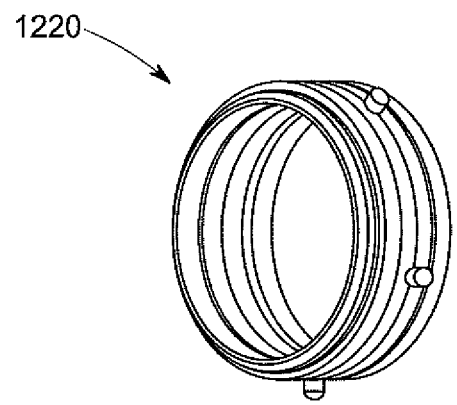
FIG. 21A is an isometric view of a separator, according to one embodiment.
Figure 21B:
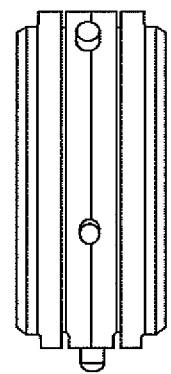
FIG. 21B is an elevational view of the separator of FIG. 21A.
Figure 21C:
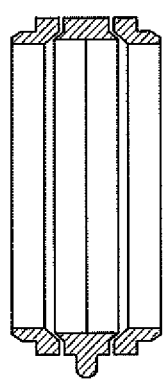
FIG. 21C is a cross-sectional view of the separator of FIG. 21A.
Figure 21D:
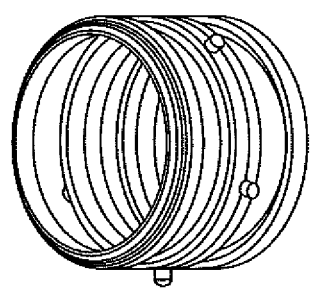
FIG. 21D is an exploded view of the separator of FIG. 21A.

The separators positioned between consecutive electrodes may comprise a plurality of contiguous rings 1220. Several embodiments of contiguous rings 1220 are shown in FIGS. 19-21. For example, the separator may comprise two, three, or four contiguous rings. In some embodiments, at least one of the contiguous rings comprises a plurality of projections, as previously described. The contiguous rings may be configured to mate with each other and/or with an adjacent consecutive electrode. Any gaps occurring between the contiguous rings may be minimized to reduce a zone of reduced velocity existing downstream from the separator. For instance, the gap between contiguous rings may be dimensioned to maintain the zone of reduced velocity within a predetermined length, as previously described. In some embodiments, seals may be implemented between contiguous rings to reduce the effective gap, and thus the zone of reduced velocity.

The gap between contiguous rings may be less than 1.60 times a width of the separator, for example, of a ring of the separator. For example, the separator may comprise a ring having a width between 1 and 3 mm. The gaps between contiguous rings may be less than 4.80 mm, less than 3.20 mm, or less than 1.60 mm. The width of the gap may be between 0.5 and 4.80 mm, between 0.5 and 3.20 mm, or between 0.5 and 1.60 mm. In an exemplary embodiment, the separator may comprise a plurality of contiguous rings having a width of 1 mm, wherein gaps between the each two of the plurality of rings have a width between 0.5 and 1.60 mm. In general, the width of the gap between contiguous rings may be dimensioned to be as small physically possible. If possible for manufacture, the contiguous rings may have substantially no gap between them.

Figure 8A:
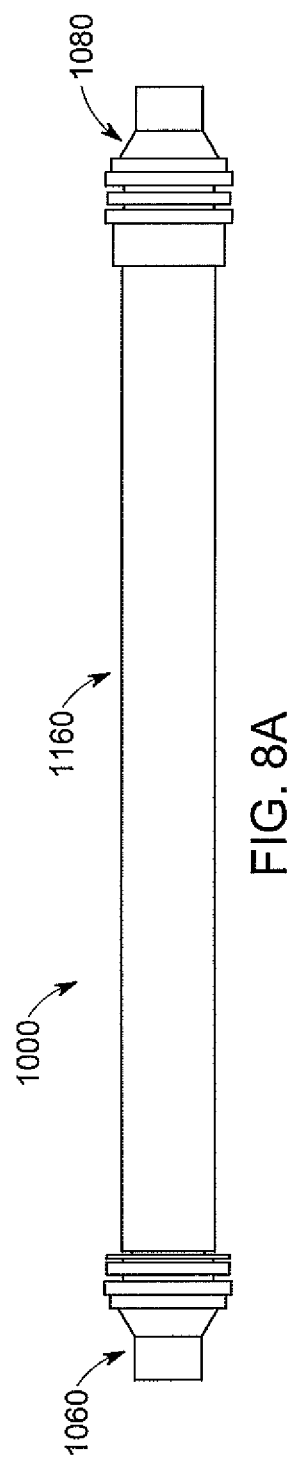
FIG. 8A is an elevational view of an electrochemical cell, according to one embodiment.
Figure 8B:
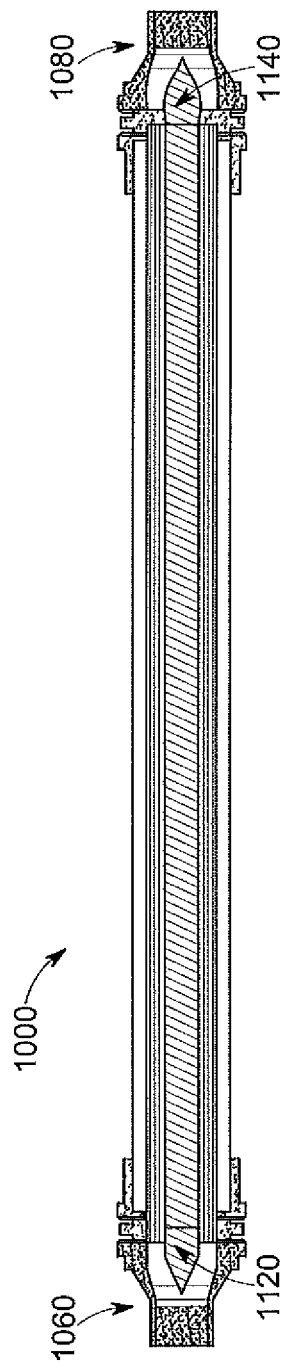
FIG. 8B is a cross-sectional view of the electrochemical cell of FIG. 8A.
Figure 9B:
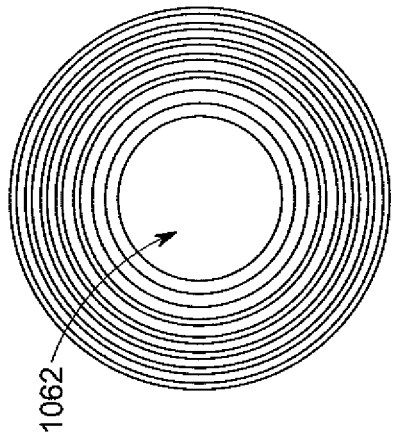
FIG. 9B is a plan view from the bottom of the end cap of FIG. 9A.
Figure 9D:
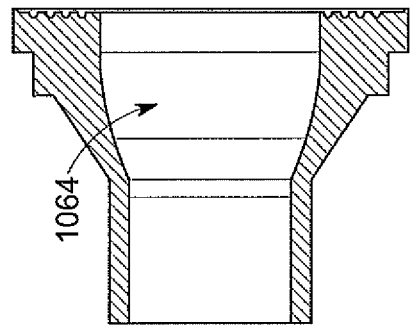
FIG. 9D is a cross-sectional view of the end cap of FIG. 9A.
Figure 9A:
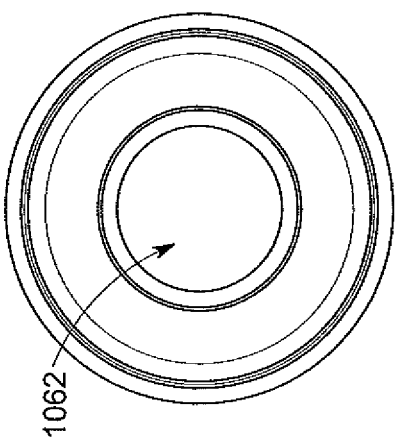
FIG. 9A is a plan view from the top of an end cap, according to one embodiment.
Figure 9C:
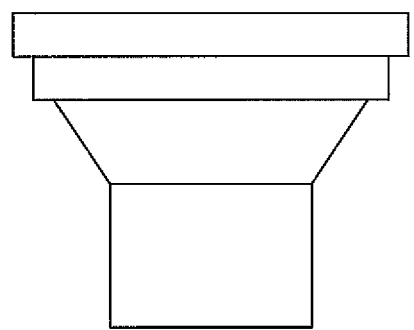
FIG. 9C is an elevational view of the end cap of FIG. 9A.

In accordance with certain embodiments, for example, as shown in FIGS. 8A and 8B, the electrochemical cell 1000 may include inlet and outlet end caps 1060 and 1080, each coupled to a distal end of the housing 1160. The end caps 1060, 1080 may have a substantially centrally located aperture 1062 (as shown in FIGS. 9A and 9B, which are top and bottom views of an end cap, respectively). As shown in the cross-sectional view of FIG. 8B, the apertures may be in fluid communication with fluid channels between anodes and cathodes in the interior of the electrochemical cell. The end caps may further include fluid conduits 1064 (as shown in the cross-sectional view of FIG. 9D) providing fluid communication between the apertures and the fluid channel of the electrochemical cell. Fluid, for example, electrolyte solution, may thus be introduced into the electrochemical cell through one or more fluid conduit of the inlet end cap and continue through the gap between the electrodes, i.e., the fluid channel. The fluid may exit the electrochemical cell through a fluid conduit of the outlet end cap and out the substantially centrally located aperture.

The fluid conduit within the end cap may be designed to minimize a pressure drop across the electrochemical cell. In a cylindrical pipe, the pressure loss due to viscous effects is proportional to length and characterized by the Darcy-Weisbach equation:

$$\frac{\Delta p}{L} = f_D \cdot \frac{\rho}{2} \cdot \frac{\langle v \rangle^2}{D}$$

where:
$\Delta p$ is pressure loss (Pa),
L is length of the conduit (m),
D is hydraulic diameter (m),
$f_D$ is friction factor (determined by Reynolds number, absolute roughness and relative roughness of the material, and coefficient of friction),
$\rho$ is density of the fluid (kg/m$^3$), and
$\langle v \rangle$ is the mean flow velocity (m/s).

Thus, pressure drop may vary with length, hydraulic diameter, and material of the conduit. In some embodiments, a radius and/or length of the fluid conduit may be dimensioned to minimize pressure drop within the electrochemical cell. Additionally, fluid density and flow velocity may also have an effect on pressure drop.

The pressure drop may be determined by the difference between inlet pressure and outlet pressure through an electrochemical cell. In some embodiments, minimizing pressure drop includes minimizing inlet pressure. Thus, in some embodiments, a radius and/or length of the fluid conduit of an inlet end cap may be dimensioned to maintain a desired inlet pressure. Inlet pressure may be maintained below, for example, 125 kPa, 122 kPa, 120 kPa, 118 kPa, 117 kPa, 116 kPa, or 115 kPa. However, inlet pressure should be maintained within a range that promotes suitable use of the electrochemical cell. Inlet pressure may be maintained between about 115 kPa and 125 kPa, for example, between about 117 kPa and 121 kPa. Outlet pressure may be maintained between about 100 kPa and 105 kPa, for example, between about 101 kPa and 103 kPa. A minimized pressure drop may be as close to substantially no pressure drop as allowable by manufacturing and material constraints, for example, below 25 kPa, 24 kPa, 23 kPa, 22 kPa, 21 kPa, 20 kPa, below 19 kPa, below 18 kPa, below 17 kPa, below 16 kPa, below 15 kPa, or lower. The minimized pressure drop may be dependent on the electrolyte solution fluid density and average flow velocity (for example, self-cleaning flow velocity for such a fluid).

In some embodiments, the fluid conduit includes a zone of a first radius and a zone of a second radius greater than the first radius. The zone of the first radius may be adjacent to the substantially centrally located aperture, while the zone of the second radius may be adjacent the fluid channel. In an exemplary embodiment, the fluid conduit of the inlet end cap has a first linear region, a radially increasing region, and a second linear region, where the first linear region may correspond to the first radius and the second linear region may correspond to the second radius. The end cap may comprise a feature for mating with the end of the housing.

The end caps may be constructed from a chemically-inert, non-conductive material capable of withstanding high pressure. In some embodiments, the end caps may be constructed to withstand up to 16 Bar pressure, system high-frequency vibrations, and environmental low-frequency vibrations (for example, onboard a ship). The end caps may be constructed to withstand an electrolyte solution flow rate of up to 10 m/s. The end caps may be constructed from plastic or ceramic. The end caps may comprise one or more of PVC, PTFE, PVDF, ABS, HDPE, FRP, or other appropriate materials.

Figure 10B:
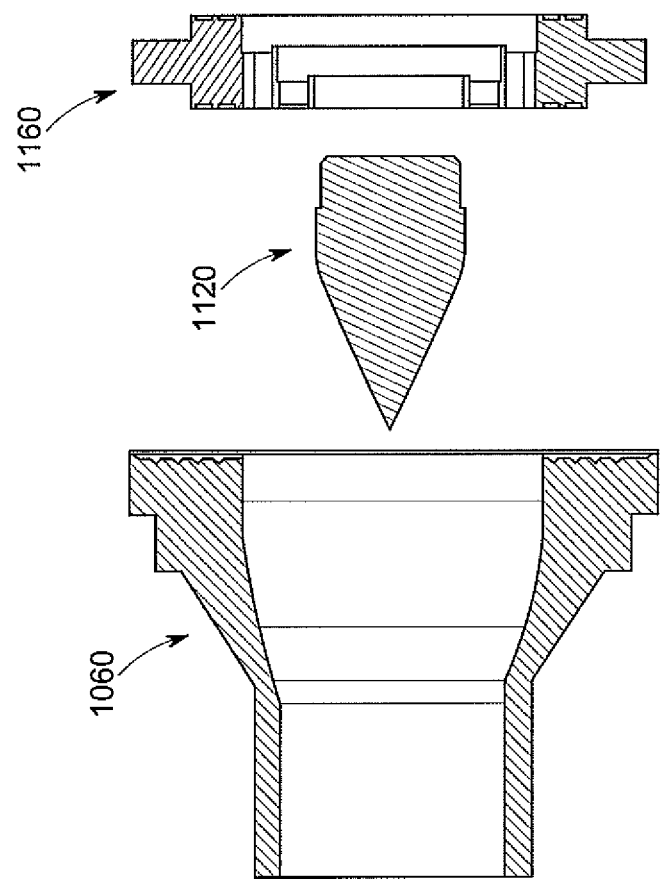
FIG. 10B is an exploded view of the portion of the electrochemical cell of FIG. 10A.
Figure 10A:
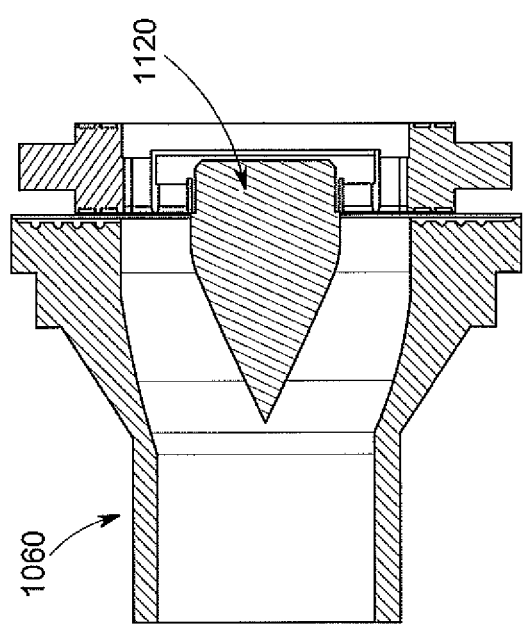
FIG. 10A is a cross-sectional view of a portion of an electrochemical cell, according to one embodiment.

As shown in FIGS. 10A and 10B, the electrochemical cell may further comprise a cone 1120 disposed within the fluid conduit of the end cap 1060 and configured to define a flow path for a solution into the fluid channel. The cone 1120 may be coupled to the housing 1160 to define a flow path into the fluid channel. In some embodiments, the cone may be coupled to the electrode 1020 (as shown in FIG. 11A), electrical connector 1240 (as shown in FIG. 11B), or other element of the electrochemical cell, to define a fluid flow path into the fluid channel. Thus, the cone may have a base diameter equal or substantially equal to an inner diameter of the fluid channel.

Figure 12:
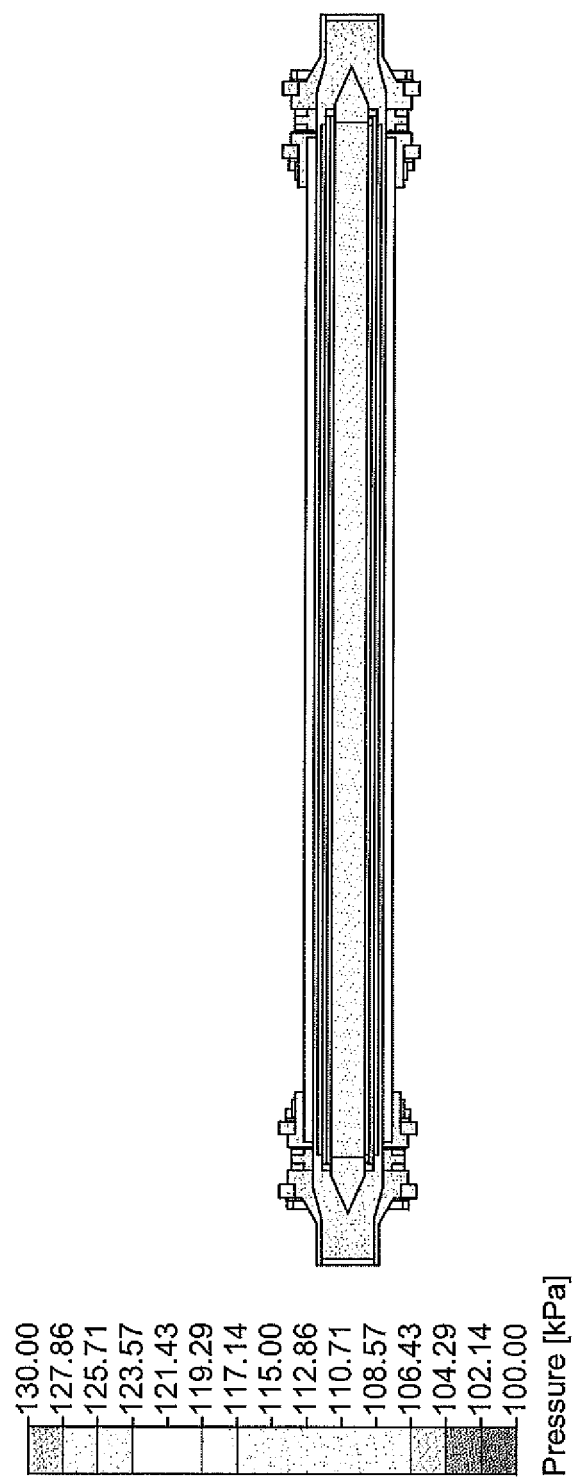
FIG. 12 is a contour map of pressure drop across an electrochemical cell, according to one embodiment.
Figures 13A, 13B, 13C:
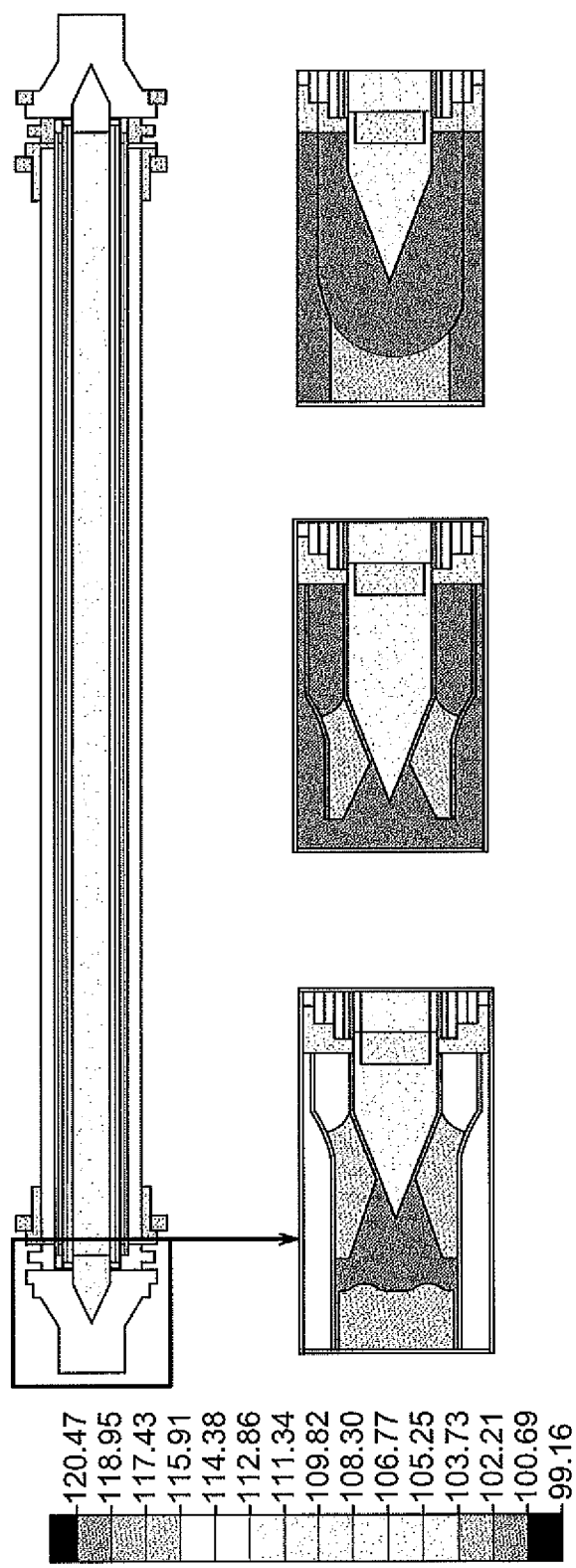
FIG. 13A is a contour map of inlet pressure in an inlet end cap of an electrochemical cell, according to one embodiment.
FIG. 13B is an alternate contour map of inlet pressure in an inlet end cap of an electrochemical cell, according to another embodiment.
FIG. 13C is an alternate contour map of inlet pressure in an inlet end cap of an electrochemical cell, according to another embodiment.
Figure 14B:
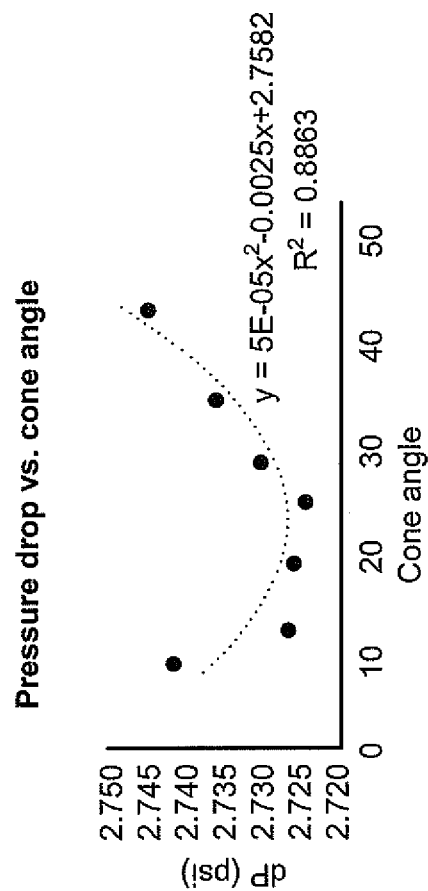
FIG. 14B is a graph of pressure drop vs. cone angle for the inlet cone embodiments of FIG. 14A.
Figure 14A:
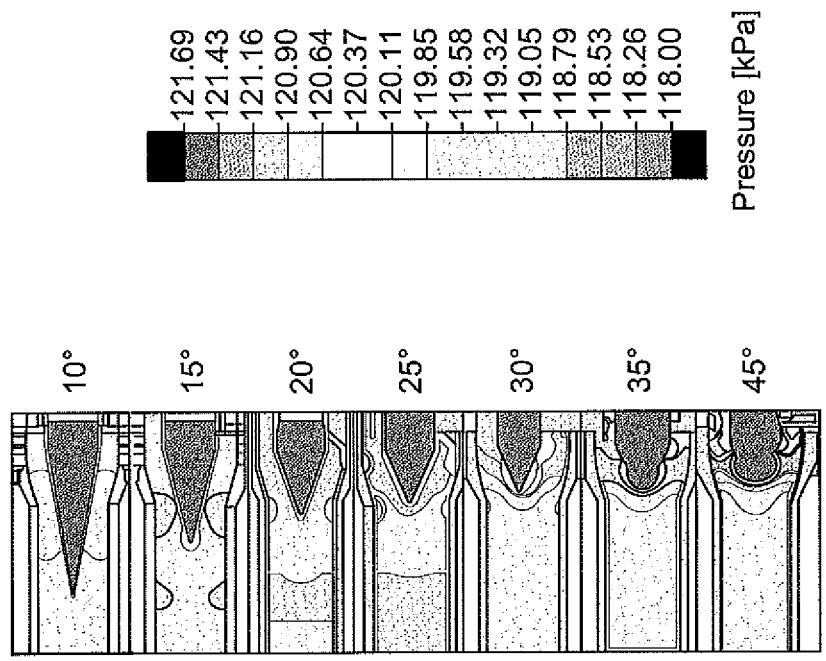
FIG. 14A is a collection of contour maps of inlet pressure in an inlet end cap of an electrochemical cell with varying inlet cone embodiments.

As previously described, pressure drop across an electrochemical cell may vary with hydraulic diameter. The inlet cone 1120, outlet cone 1140, or both (as shown in FIG. 8B) may be designed to minimize the pressure drop across the electrochemical cell, for example, by altering a hydraulic diameter of the flow path. FIG. 12 is a contour map of pressure drop across an exemplary electrochemical cell. As shown in FIG. 12, there is a pressure differential across the fluid channel. Varying the dimensions of the inlet end cap fluid channel may have an effect on inlet pressure, as shown in FIGS. 13A-C. Additionally, varying the dimensions of the inlet cone may have an effect on pressure drop, as shown in FIG. 14A and the data presented in the graph of FIG. 14B.

Minimizing the pressure drop may include, for example, maintaining a substantially constant flow area between the fluid conduit and the cone. Generally, the cone may have a base that is dimensioned to correspond with the fluid channel. For an annular fluid channel, the base may have a diameter that substantially corresponds with an inner diameter of the annular fluid channel. In addition to designing the dimensions of the fluid conduit to reduce pressure drop, one or more of height, apex angle, base angle, and slant height of the cone may be dimensioned to minimize the pressure drop across the electrochemical cell. The inlet cone, outlet cone, or both may independently have an apex angle of between 20° and 90°, for example between 30° and 80° or between 40° and 60°. The inlet cone, outlet cone, or both may independently have an apex angle of 10°, 20°, 30°, 40°, 50°, 60°, 70°, 80°, 90° or as necessary to minimize pressure drop across the electrochemical cell.

In some embodiments, for example, as shown in FIGS. 15A and 15B, the electrochemical cell includes an outlet frustrum 1122 in lieu of an outlet cone. The outlet frustrum 1122 may be disposed within the fluid conduit 1064 of the outlet end cap 1080 and configured to define a flow path for a solution out of the electrochemical cell. The outlet frustrum 1122 may be dimensioned to further minimize pressure drop across the electrochemical cell, as shown in the contour maps. By modifying the outlet cone to produce an outlet frustrum, total flow area of the outlet end cap is increased resulting in a further reduced pressure drop.

The fluid conduit of the end cap may be dimensioned to allow fully-developed flow of the solution. Additionally, the flow path defined between the fluid conduit and the cone can be dimensioned to maintain the fully-developed flow of the solution. As used herein, fully-developed flow occurs when the boundary layer of the flow through the fluid conduit expands to fill the entire conduit, such that the flow characteristics remain substantially the same throughout the remaining length of the conduit. The entrance length is the conduit length required so that the fluid flow becomes fully-developed. The length of the flow path may be greater than the entrance length of the particular solution, such that the flow traveling between the conduit and the cone becomes and/or remains fully-developed.

The flow path may have a hydraulic diameter defined by the space between the cone and the fluid conduit. In some embodiments, the flow path may have a hydraulic diameter that is between 2 and 10 times the length of the greater linear region of the fluid conduit (i.e. the zone of the second radius) to maintain fully-developed flow. The flow path may have a hydraulic diameter that is at least 2, 3, 4, 5, 6, 7, 8, 9, or 10 times the length of the zone of the second radius, or as necessary to maintain fully-developed flow of the particular electrolyte solution. In general, the length of the zone of the second radius may be as large as possible, while maintaining an adequate inlet pressure and pressure drop across the electrochemical cell.

The end caps could potentially serve dual purposes, as they could also incorporate electrical connectors for the delivery of current to electrodes and provide a pneumatic seal for the electrochemical cell. For instance, end caps when fastened to opposing ends of the electrochemical cell, may form pneumatically sealed chambers. The caps may provide a configuration for pneumatic and electrical routing of the gas conduits.

As shown in FIGS. 23A-23D, the electrochemical cell 1000 may include electrical connectors 1240 positioned at distal ends of the electrodes and electrically connected to the electrodes. Electrical current may be applied to the electrochemical cell through an electrical connector, travel internally through the electrodes and process fluids, and exit the electrochemical cell through a corresponding ground connection. The maximum current applied to an electrochemical cell may be defined by its operational current density, generally less than about 3000 A/m$^2$. The operational current density may vary with electrode coating and internal electrode surface area. During design of the electrochemical cell, resistance may vary with surface area of the electrical connector, applied current, resistivity of the cell material, and heat capacity rate of the cell.

The electrical connectors may be made of any conductive, corrosion resistant material. In some embodiments, the electrical connectors may be made of the same material as one or more of the electrodes, for example, titanium. The electrical connector may be fixed to the electrodes, for example, via a mating feature or welding. The electrical connector may be manufactured from a continuous conductive sheet or may contain features that are welded or otherwise conductively joined together. Conventionally, electrical connectors are easy to manufacture but are not designed to be aqualined. Thus, the conventional electrical connectors generally create a large region of low flow velocity downstream.

A first electrical connector may be provided on a first end of a multi-tube electrochemical cell as disclosed herein to provide electrical contact to the anode electrode tube(s) and a second electrical connector may be provided on a second end of a multi-tube electrochemical cell as disclosed herein to provide electrical contact to the cathode electrode tube(s). Apertures may be provided in the electrical connectors to allow fluid to flow through the gaps between the concentric electrode tubes. Spokes of the electrical connectors may have positioning elements, for example, slots, tabs, pins, and/or protrusions at intervals, for example, to engage the electrode tubes and/or spacers. An outer rim of the electrical connector can be connected to a source of power utilizing a single connector or multiple connectors.

The connection between an electrical connector and an electrical wire from a power source can be sealed and isolated from the environment, for example with gaskets, screws, and/or bolts, for safety and corrosion prevention. Waterproof connectors (for example, IP54 connectors) may be used to connect the electrical connector to the source of power. Certain embodiments may also provide for a high ingress protection (IP) rating, which protects operators from shock hazard and dispenses with the need for an expensive weatherproof enclosure. In an exemplary embodiment, high density plastic pipework components using, for example, ABS, U-PVC, C-PVC, and/or PVDF material may be used to seal and isolate the electrical connector due to their chemical resistance, for example, to sodium hypochlorite and a high achievable pressure rating in the range of about 5 to about 15 Bar. Commercially available high IP rated cable connectors may be used to transfer current to and from the electrodes.

The electrical connectors may be designed to minimize electrical resistance and heat generation. Generally, the electrical resistance is a function of device geometry and material resistivity. Heat generation increases with increasing resistance in accordance with the Joule-Lenz law, which provides that the power of heat generated by an electrical conductor is proportional to the product of its resistance and the square of the current. When operated in series, heat generated within each electrochemical cell is cumulative across the series and should be minimized. However, applied current should be maintained within an appropriate range to generate the desired product. Thus, in some embodiments, the electrical connectors may be dimensioned to minimize resistance (and therefore, heat generation) for a given material while providing adequate current.

Figure 25C:
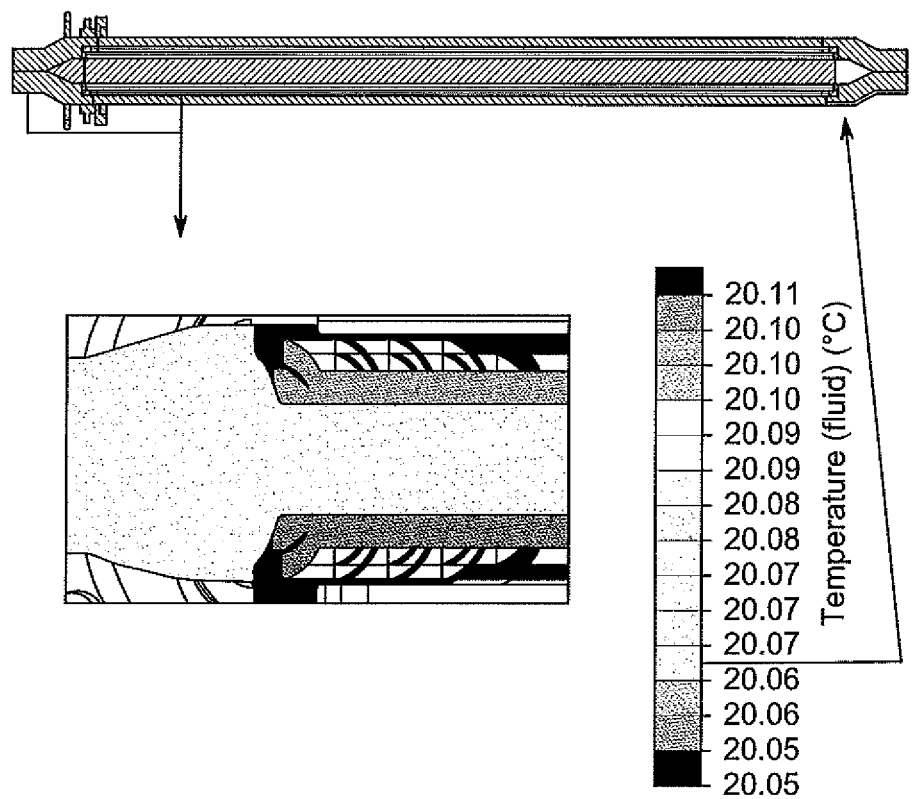
FIG. 25C is a contour map of temperature around an electrical connector of an electrochemical cell, according to one embodiment.

In an exemplary embodiment, the electrical connector may be titanium based. The electrical connectors may be operated to transmit between 25 W and 1.5 kW of power to the electrodes, for example between 25 W and 100 W, between 100 W and 1 kW, or between 1 kW and 1.5 kW. The electrical connectors may be dimensioned to generate less than about 100 W of heat, for example, less than about 75 W of heat, less than about 50 W of heat, or less than about 25 W of heat. In some embodiments, the electrical connectors may be dimensioned to generate less than about 25 W of heat when transmitting at least 100 W of power to the at least one of the plurality of electrodes. In such an embodiment, the electrical connector may be dimensioned to generate less than 1° C., for example, less than about 0.5° C. or less than about 0.1° C. when transmitting at least 100 W of power. FIG. 25C is a contour map of heat generated at the electrical connector. As shown in the exemplary embodiment of FIG. 25C, temperature of the fluid increases from about 20.05° C. at the inlet to up to 20.10° C. following the electrical connector and around 20.07° C. at the outlet of the electrochemical cell. In other embodiments, the electrical connectors may be dimensioned to generate less than about 25 W of heat when transmitting at least 1 kW of power, dimensioned to generate less than about 100 W of heat when transmitting at least 1 kW of power, or dimensioned to generate less than about 100 W of heat when transmitting at least 1.5 kW of power. The power transmitted may depend on the operational requirements.

Figure 25D:
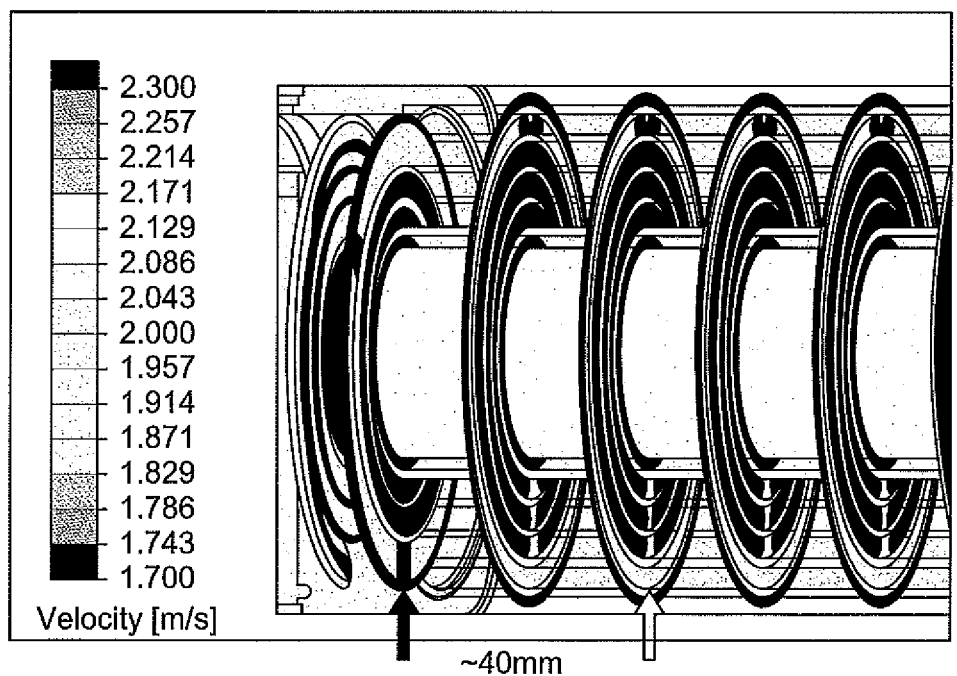
FIG. 25D is a contour map of velocity downstream from an electrical connector of an electrochemical cell, according to one embodiment.

The electrical connector may be designed to minimize a zone of reduced velocity which occurs downstream from the electrical connector. FIG. 25D is a contour map of velocity downstream from an exemplary electrical connector. As previously mentioned with respect to the separators, the zone of reduced velocity is minimized to maintain the self-cleaning properties of the electrochemical cell. The electrochemical connection may be dimensioned to maintain the zone of reduced velocity within the predetermined length, as previously described.

The electrical connectors may additionally be designed to provide a substantially uniform current distribution around the concentric electrodes. Current distribution around an inner electrode 1020 and an outer electrode 1040 are shown in FIG. 25B. The electrical connectors may have a symmetric or substantially symmetric geometry to provide substantially uniform current distribution.

Figure 24B:
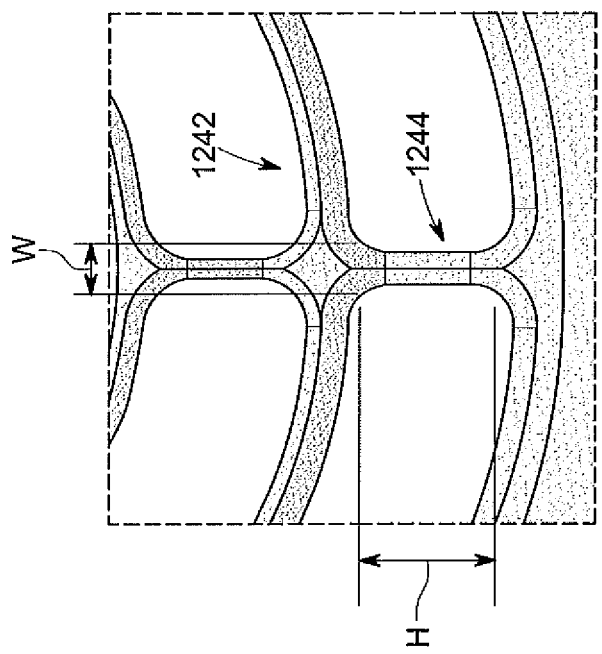
FIG. 24B is a magnified view of a portion of the electrical connector of FIG. 24A.
Figure 24A:
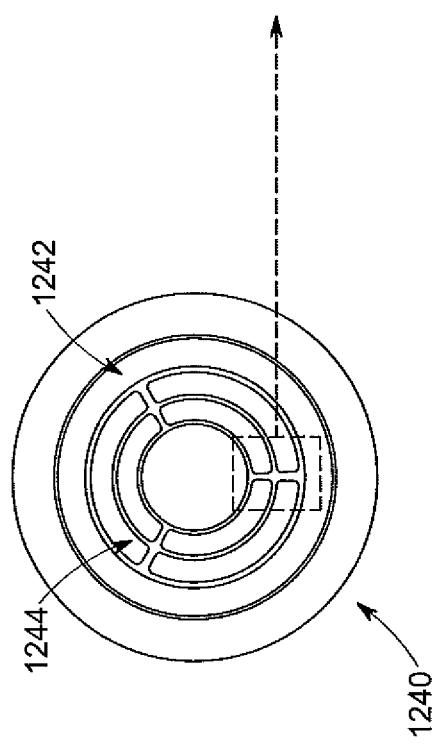
FIG. 24A is an elevational view of an electrical connector, according to one embodiment.
Figure 24C:
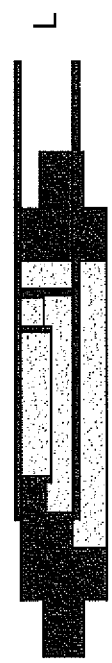
FIG. 24C is a side view of a portion of the electrical connector of FIG. 24A.

As shown in FIGS. 24A-24C, the electrical connector 1240 may include a wheel 1242 and spokes 1244. Each wheel 1242 may be configured to provide electrical connection to a corresponding electrode tube. Thus, for embodiments with multiple concentric electrode tubes, the electrical connector may include corresponding concentric wheels. The spokes may be configured to provide electrical connection between concentric wheels. In some embodiments, the spokes may be rectilinear for ease of manufacturing and to reduce resistance, but may be of any geometry desired. The electrical resistance of a spoke can be defined by the below equation:

$$R = \rho H / (W \times L)$$

where:
R is resistance,
$\rho$ is material resistivity,
H is spoke height, determined by the gap between concentric wheels,
W is spoke width around the circumference of the wheel, and
L is spoke length down the fluid channel.

The number and dimensions of spokes may be selected to minimize resistance, heat generation, and the zone of reduced velocity created by the electrical connector. The resistance of an individual spoke should result in an ohmic loss of less than about 50 W, for example, less than about 25 W or less than about 10 W. The maximum tolerated ohmic loss of a spoke and electrical connector may be selected based on the desired electrochemical reaction in conjunction with the heat capacity rate of the particular electrolyte solution flowing through the electrochemical cell.

In general, the height of the spoke, identified by H in FIG. 24B, may be determined by the gap between concentric wheels. Thus, the height may substantially correspond to the width of a fluid channel. In some embodiments, where alternating electrodes are electrically connected, the height may substantially correspond to the width of two or more concentric fluid channels. The height may be between about 1 and 20 mm, for example about 20 mm, about 16 mm, about 14 mm, about 10 mm, about 8 mm, about 7 mm, about 6 mm, about 5 mm, about 3.5 mm, about 3 mm, or substantially equivalent to the width of one or more fluid channels. In embodiments where the wheel of the electrical connector has a smaller width than the electrode, the height of the spoke may be greater than the width of one or more fluid channels, as necessary to provide connection between concentric adjacent or non-adjacent wheels.

The width of the spoke, identified by W in FIG. 24B, may be dimensioned to minimize the length of the zone of reduced velocity (as described above with respect to the separator) while providing adequate electrical connection between concentric wheels. In some embodiments, the width of the spoke may be between 0.25 and 2 times the height of the spoke. For example, the width of the spoke may be between about 0.5 mm and about 10 mm, between about 0.5 mm and about 7 mm, between about 0.5 mm and about 5 mm, between about 0.5 mm and about 3 mm, between about 0.5 mm and about 2 mm, or between about 0.5 mm and about 1 mm. The width of the spoke may be between about 1 mm and about 20 mm, between about 1 mm and about 15 mm, between about 1 mm and about 12 mm, or between about 1 mm and about 10 mm. The width of the spoke may be as small as necessary to reduce drag of the fluid, but adequate for providing electrical connection between concentric wheels. In some embodiments, the material may be selected to provide adequate resistance in a small volume. Conventionally, manufacturing constraints have restricted the selection of size of the electrical connector. However, titanium can provide greater resistivity in a small volume, reducing the zone of reduced velocity. Furthermore, the spokes and/or wheels can be aqualined to further reduce the zone of reduced velocity.

The length of the spoke, identified by L in FIG. 24C, may be dimensioned to minimize electrical resistance and heat generation, while maintaining a desired power dissipation. For a given height (the gap between concentric wheels) and width (the width selected to minimize the zone of reduced velocity), the length can be selected based on a threshold resistance using the equation above. Furthermore, the resistance may be selected to minimize heat generation, as described above. In some embodiments, the length may be between about 1 mm and about 15 mm, for example, between about 5 mm and 15 mm or between about 7.5 mm and 15 mm.

The resistance, heat generation, power dissipation, and zone of reduced velocity of the electrical connector may also be dependent on the number of spokes provided. In some embodiments, the number of spokes is selected to minimize electrical resistance, minimize heat generation, minimize zone of reduced velocity, or provide adequate power dissipation. The electrical connectors may include between about 1 and 8 spokes between adjacent wheels, for example, between about 2 and 6 spokes or between about 3 and 6 spokes, or as necessary to meet the desired requirements.

In general, the amount of current through a spoke may be determined by the applied current, surface area of the tubular electrode, and number and distribution of spokes. The arrangement of spokes on the electrical connector may have an effect on current distribution across the wheel(s). In some embodiments, the spokes may be substantially evenly distributed to provide uniform current distribution. In an exemplary embodiment, current distribution improves with an increasing number of spokes, wherein the spokes are substantially evenly distributed across the wheel. Thus, the number and arrangement of spokes may be selected to provide adequate current distribution, while maintaining the zone of reduced velocity within a predetermined length to maintain self-cleaning properties of the electrochemical cell, as described above.

Furthermore, the arrangement of spokes on a first wheel with respect to spokes on an adjacent concentric wheel may have an effect on current distribution. Spokes on adjacent wheels may be arranged collinearly (i.e. aligned with each other) or may be angularly offset from each other. In some embodiments, spokes provided on adjacent concentric wheels may be substantially evenly offset from each other to provide uniform current distribution. In an exemplary embodiment, current distribution improves with an increasing number of spokes, wherein the spokes provided on adjacent concentric wheels are substantially evenly offset.

Exemplary embodiments of electrical connectors are shown in FIGS. 26A, 26B, 27A, and 27B. The current distribution across the exemplary embodiments of FIGS. 26A and 26B are shown in FIGS. 26C and 26D (left and right images, respectively). The current distribution across the exemplary embodiments of FIGS. 27A and 27B are shown in FIGS. 27C and 27D (left and right images, respectively). The zone of reduced velocity produced by each of the exemplary electrical connectors of FIGS. 26A, 26B, 27A, and 27B are shown in the contour maps of FIGS. 28A-28D, where FIG. 28A corresponds to the exemplary embodiment of FIG. 26A, FIG. 28B corresponds to the exemplary embodiment of FIG. 26B, FIG. 28C corresponds to the exemplary embodiment of FIG. 27A, and FIG. 28D corresponds to the exemplary embodiment of FIG. 27B.

Each of the exemplary contour maps of FIGS. 26 and 28 were calculated for a sample electrolyte solution of seawater flowing at an average velocity of 2.0 m/s.

Figure 29B:
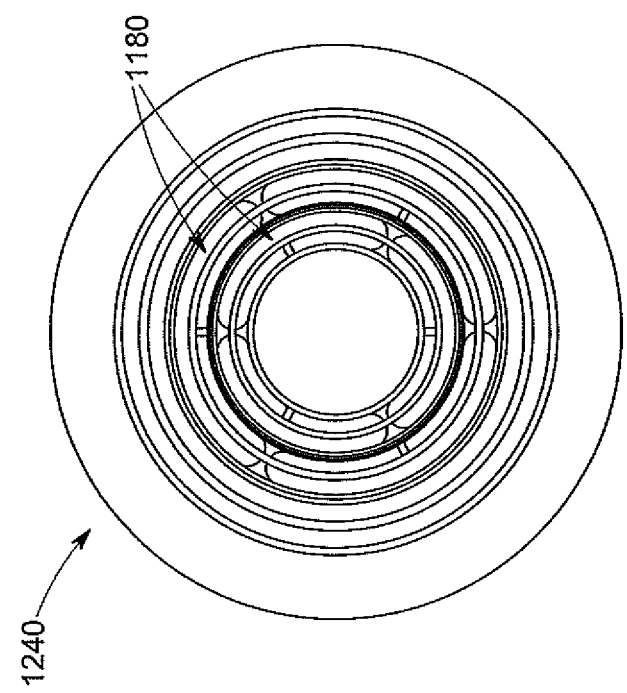
FIG. 29B is a plan view of the electrical connector and separator assembly of FIG. 29A.
Figure 29A:
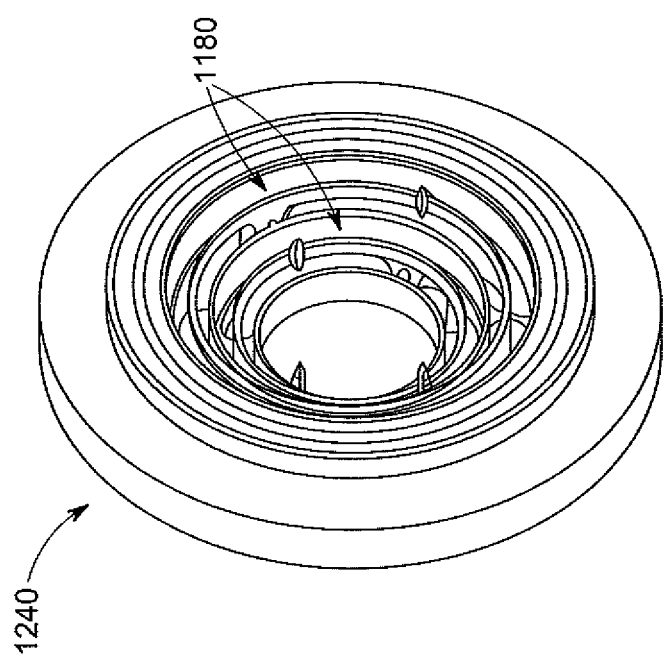
FIG. 29A is an isometric view of an electrical connector and separator assembly of an electrochemical cell, according to one embodiment.

In some embodiments, as shown in FIGS. 29A-29B, the electrical connector 1240 may contain a feature to mate with the separator 1180. The dimensions of the separator and electrical connector may be designed taking into consideration the effect on the zone of reduced velocity that the combination of elements may create. In some embodiments, the projections of the separator can be collinear with one or more spokes of the electrical connector to reduce the zone of reduced velocity. In other embodiments, the projections of the separator may be angularly offset from the spokes of the electrical connector.

Additionally, during operation of an electrochemical cell, it is often desirable to keep the operating temperature low even when a higher flow of electrical current is passed to the electrochemical cell. Conventional electrochemical cells typically include titanium only electrical connectors welded to a titanium outer shell. The titanium electrical connectors generally provide for a high degree of chemical resistance but may not be optimal for providing current to the electrochemical cell without generating undesirable amounts of heat (and wasted energy). Due to the high resistivity of titanium connectors, the current supplied to the traditional titanium connector may have to be limited, so the temperature rise of the connectors in air does not rise excessively. However this limits the output of product produced by the electrochemical cell, as product generation is directly proportional to current input. Because of the heat generation in traditional titanium connectors, the connectors cannot be totally enclosed in an electrically insulating material with a high Ingress Protection Level of IP54 or greater. This arrangement ordinarily results in the requirement for expensive electrical enclosures that do not trap heat as much as an encapsulated electrical connector. To overcome these problems, traditional titanium connectors are often made of larger cross-section material which substantially increases the cost of electrical connector and electrochemical cell.

The resistivity of copper is $1.707 \times 10^{-8}$ ohm-m while the resistivity of titanium is $7.837 \times 10^{-7}$ ohm-m. Copper has nearly 46 times less electrical resistivity than titanium. Accordingly, in some embodiments the electrical connector may be at least partially made of low-resistivity copper. Copper, however, is more susceptible to chemical corrosion than titanium and thus should be kept out of contact with electrolyte running through an electrochemical cell.

In some embodiments, the electrical connector part in contact with the process fluid or electrolyte (for example, seawater containing corrosive traces of equivalent chlorine), may be titanium. The heat generated by electrical currents flowing through this material is efficiently removed by the flowing process fluid. As the self-cleaning flow velocity of process fluid may be in excess of 2 m/s, the temperature rise in the titanium part of the electrical connector is generally kept to a negligible value. The electrical connector part in contact with air may be copper (or another metal or alloy having a lower resistivity than titanium).

Air-liquid cooled electrical connectors including portions formed of different metals, for example, titanium and copper (or another metal or alloy having a lower resistivity than titanium) may overcome problems exhibited by traditional titanium connectors. A lower electrically resistant metal (e.g. copper) may form or be included in a portion of the electrical connector exposed to air. It is to be understood that copper is an example of a high conductivity material, and the electrical connectors disclosed herein may substitute another high conductivity material or alloy for copper. Thus, the terms "copper portion" and "copper" are used herein for convenience, but it is understood that these terms do not limit these elements to being formed of copper.

Due to the superior low electrical resistance of copper, the temperature rise may be limited to a small and acceptable value. This outer conductor may be joined to the inner higher chemical resistant (for example, titanium) part of the connector which is in contact with process liquid (for example, seawater). Due to the water-cooling effect of the process liquid, temperature rise of the inner higher chemical resistant part (for example, titanium) of the connector can be effectively limited to a small and acceptable value.

The overall dual metal electrical connector may be more cost efficient than a traditional titanium-only connector for a comparable current rating. The outer conductor of the dual metal electrical connector may exhibit a low temperature rise and can be encapsulated in electrically insulating materials, thus removing the need for expensive electrical enclosures. Also, embodiments of the air-liquid cooled dual metal electrical connector can provide for the supply of much higher current to electrochemical cells being developed than would otherwise be the case with traditional titanium only electrical cell connectors.

The titanium portion and the copper portion may be physically and electrically connected within a flange of the electrochemical cell that provides a hermetic seal about the connector portions and seals the interior of the electrochemical cell from the external environment using, for example, gaskets. In some embodiments the titanium portion may be coupled to the copper portion by mechanical fasteners, for example, bolts. The bolts 1420 may be formed from the same material as the titanium portion or the copper portion. The titanium portion may include arms or spokes that make electrical contact with one of anodes or cathodes in an electrochemical device and apertures to allow for process fluid, for example, electrolyte, to flow into or out of the electrochemical device. The arms or spokes may include a feature, for example, slots to facilitate engagement with electrodes in the electrochemical device. The titanium portion may additionally or alternatively be coupled to the copper portion by an interference fit. The copper portion may extend from the titanium portion or may completely surround the titanium portion.

Additionally, the titanium portion may include a threaded outer rim that may be screwed into place in the copper portion by engaging complimentary threads on an inner rim of an aperture in the copper portion. The copper portion may include a lower cylindrical threaded portion that screws into an aperture in the titanium portion.

In a further embodiment, the copper portion may be replaced by a polymetallic electrical connector, for example, an alloy of titanium and copper or one or more other high conductivity metals. The polymetallic electrical connector may have a lower resistivity than titanium. The polymetallic electrical connector may be welded or otherwise physically continuous with the titanium portion.

A solid central core element or fluid flow director may be provided to prevent fluid from flowing down the center tube of an electrochemical cell and bypassing the gap. The core may be formed of a non-conductive material, for example, any one or more of PVC, PTFE, PVDF, ABS, HDPE, or other appropriate materials. The core may be mechanically unconnected to the anode and cathode. In other embodiments, one or more mechanical fasteners may be provided to fix the core in place and/or attach the core to the housing or another element of the electrochemical cell, for example, the electrode or end cap. In other embodiments, the core is held in place within the innermost electrode by a friction fit. The core may contact only a single one of the anode and cathode electrodes in some embodiments. One of the anode and cathode electrodes may be unconnected to and not contact the core.

In other embodiments, the central core element may be a conductive member that is electrically coupled to one of the anode and cathode electrodes and may be utilized to deliver current to the one of the anode and cathode electrodes. In further embodiments, the central core element may include axial busbars and/or other conductive central elements insulated from one another with a first axial busbar and/or other conductive central element electrically coupled to the anode and a second axial busbar and/or other conductive central element electrically insulated from the first and electrically coupled to the cathode.

The electrochemical cell may include internal baffles. The baffles may be utilized to control or modify the flow direction and/or mixing of fluid passing through the electrochemical cell and may provide additional path length to the fluid flow channels as compared to an electrochemical cell in the absence of the baffles. Fluid flow through the electrochemical cell may be from inlet apertures to the fluid conduit or from the fluid conduit to the outlet apertures.

Electrochemical cells as disclosed herein may be included as part of a larger system. The system may be in some embodiments a sea-based system, for example, a ship or an oil rig, and in other embodiments a land based building, for example, a power plant, an oil drilling facility or system or other industrial facility. In other embodiments, the system may be or include a swimming pool, or a treatment system for drinking water, wastewater, or industrial water treatment processes, that uses one or more products of electrochemical devices, for example, a disinfectant to treat or disinfect water.

The system may include one or more electrochlorination systems that may include one or more electrochemical or electrochlorination cells or devices as disclosed herein. The system may include a source of an electrolyte solution fluidly connectable to the electrochemical cell, for example, through the substantially centrally located aperture of the inlet end cap. The source of the electrolyte solution may be configured to deliver the electrolyte solution at an average flow velocity through the fluid channel equal to or greater than the self-cleaning velocity as disclosed herein. In some embodiments, the source of electrolyte solution is configured to deliver the solution at an average flow velocity of about 2 m/s or greater.

The source of the electrolyte solution may include process liquid, which in some embodiments is seawater, brine, or brackish water from sources external and/or internal to the system. For example, if the system is a sea-based system, an external source may be the ocean and an internal source may be, for example, a ballast tank in a ship. In a land based system, an external source may be the ocean and an internal source may be brackish wastewater from an industrial process performed in the system.

The system may be configured to produce a product compound from the electrolyte solution and output a product solution comprising the product compound. The one or more electrochemical systems may produce treated or chlorinated water and/or a solution including, for example, sodium hypochlorite, from the water and distribute it to a point of use. The system may be fluidly connectable to a point of use, for example, through the substantially centrally located aperture of the electrochemical cell outlet end cap. The point of use may include a storage vessel or distribution site. The point of use may be a source of cooling water for the system, a source of disinfection agent for a ballast tank of a ship, a downhole of an oil drilling system, or any other system in which treated or chlorinated water may be useful. The point of use may include a concentrating vessel, for example, for batch recirculation of the product. Various pumps may control the flow of fluid through the system. One or more sensors may monitor one or more parameters of fluid flowing through the system, for example, ionic concentration, chlorine concentration, temperature, or any other parameter of interest.

The pumps and sensors may be in communication with a control system or controller which communicates with the sensors and pumps and controls operation of the pumps and other elements of the system to achieve desired operating parameters. The controller used for monitoring and controlling operation of the various elements of system may include a computerized control system. The output devices may also comprise valves, pumps, or switches which may be utilized to introduce product water (e.g. brackish water or seawater) the source into the electrochemical system or point of use and/or to control the speed of pumps.

One or more sensors may also provide input to the computer system. These sensors may include, for example, sensors which may be, for example, flow sensors, pressure sensors, chemical concentration sensors, temperature sensors, or sensors for any other parameters of interest to system. These sensors may be located in any portion of the system where they would be useful, for example, upstream of point of use and/or electrochemical system or in fluid communication with the source.

The system may include a plurality of electrochemical cells arranged in series. In some embodiments, the system may contain between about 2 and about 10 electrochemical cells arranged in series. The number of electrochemical cells in series may be selected as necessary to produce a product compound having the required properties. Electrochemical cells arranged in series may have components designed to minimize pressure drop, as previously described. The effects of pressure drop over subsequent electrochemical cells in series are generally cumulative.

In accordance with another aspect, there is provided a method of operating an electrochemical cell. The method may be used to operate one or more electrochemical cells as disclosed herein. The method may include introducing the electrolyte solution into the electrochemical cell, for example through the substantially centrally located aperture of the inlet end cap, at a self-cleaning velocity as disclosed herein. The method may further include fluidly connecting a plurality of electrochemical cells and operating the electrochemical cells in series. In some embodiments, the method may include introducing the electrolyte solution at an average flow velocity through the fluid channel of about 2 m/s or greater.

The method may include generating a product compound from the electrolyte solution in the self-cleaning electrochemical cell. To generate the product compound, the electrochemical cell may be operated by applying a voltage across the electrodes, for example, a voltage sufficient to generate the product compound. The voltage sufficient to generate the product compound may generally depend on the composition of the electrolyte solution, the desired composition of the product compound in a product solution, the average flow velocity through the electrochemical cell, and a number of electrochemical cells operated in series. In an exemplary embodiment, the electrodes are operated at a constant current density and the average flow velocity is controlled to produce the desired composition of the product compound. For example, the electrochemical cell may be operated at an average flow velocity of below 10 m/s, below 6 m/s, below 3.5 m/s, below 3 m/s, or below 2.5 m/s as needed to generate a product of the desired composition. In the same exemplary embodiment, a number of electrochemical cells may arranged in series may be selected to generate the desired product, for example, less than 10, less than 8, less than 6, less than 4, or at least 2 electrochemical cells may be arranged in series as needed.

The method may further comprise continuously operating the electrochemical cells or system for a predetermined period of time. As previously described, an electrochemical cell operated continuously at the self-cleaning flow velocity may reduce scaling and thus the need for acid washing of the electrochemical cell. In some embodiments, the electrochemical system may be continuously operated for at least 6 months without scaling. Such an electrochemical system may be continuously operated for 6, 12, 18, 24, or 36 months without scaling.

EXAMPLES

Example 1: Pressure Drop Across Electrochemical Cell

The fluid conduit and cone of an electrochemical cell can be designed to minimize pressure drop across the electrochemical cell. In an exemplary embodiment, CFD data was generated for inlet pressure across several inlet fluid conduit dimensions. The data assumes an electrolyte solution of seawater and an average flow velocity of 2 m/s, but other electrolyte solutions and their corresponding self-cleaning flow velocities may be used to obtain the desired conditions. The contour maps for the several fluid conduit dimensions are shown in FIGS. 13A-13C. The exemplary embodiment of FIG. 13A has a 20 mm linear region. The exemplary embodiment of FIG. 13B has a 50 mm linear region, resulting in an average inlet pressure of 119 kPa. The exemplary embodiment of FIG. 13C has a 75 mm linear region, resulting in an average inlet pressure of 117 kPa. As can be shown from the figures, an increase to the linear transition region has a concurrent reduction in pressure drop.

Additionally, CFD data was generated for several inlet cone angles at a constant fluid conduit linear length (40 mm). The data is presented in the velocity contour map of FIG. 14A and the graph of FIG. 14B. The revolved angle of the cone relative to the centerline (i.e., half of the apex angle) was increased from 10 to 45 degrees and evaluated for pressure drop. The lowest pressure drop (about 18.8 kPa or 2.725 psi) was observed for the cone having an apex angle of 50°.

For an exemplary fluid conduit having a linear region of 40 mm, an inlet cone apex angle of 50° minimizes the pressure drop across the electrochemical cell. Similar conditions may be determined for other fluid conduit and/or cone dimensions. Similar conditions may also be determined for other electrolyte solutions and/or average flow velocities.

Figure 30:
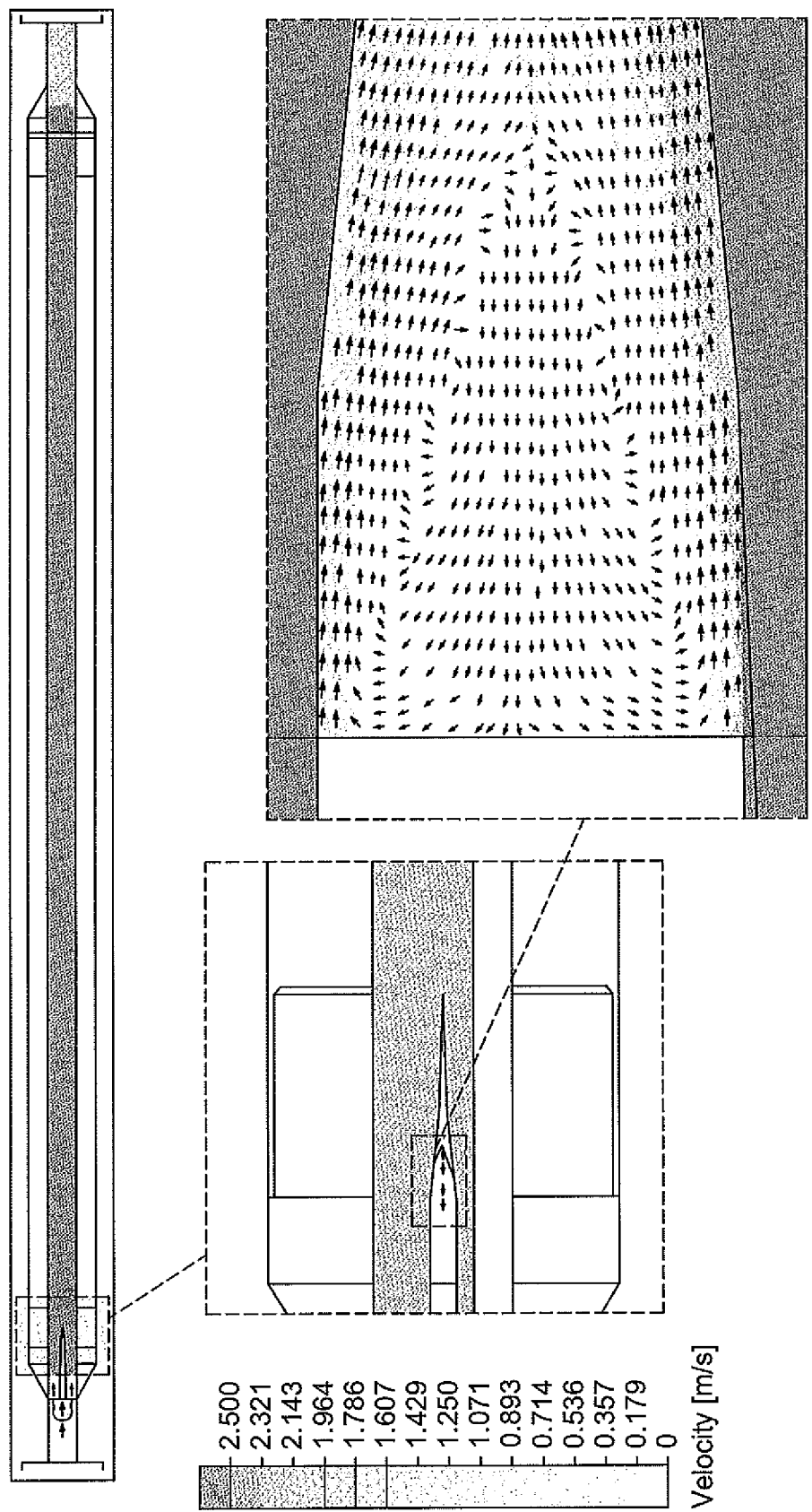
FIG. 30 includes contour maps of flow velocity through an electrochemical cell, according to one embodiment.
Figure 31:
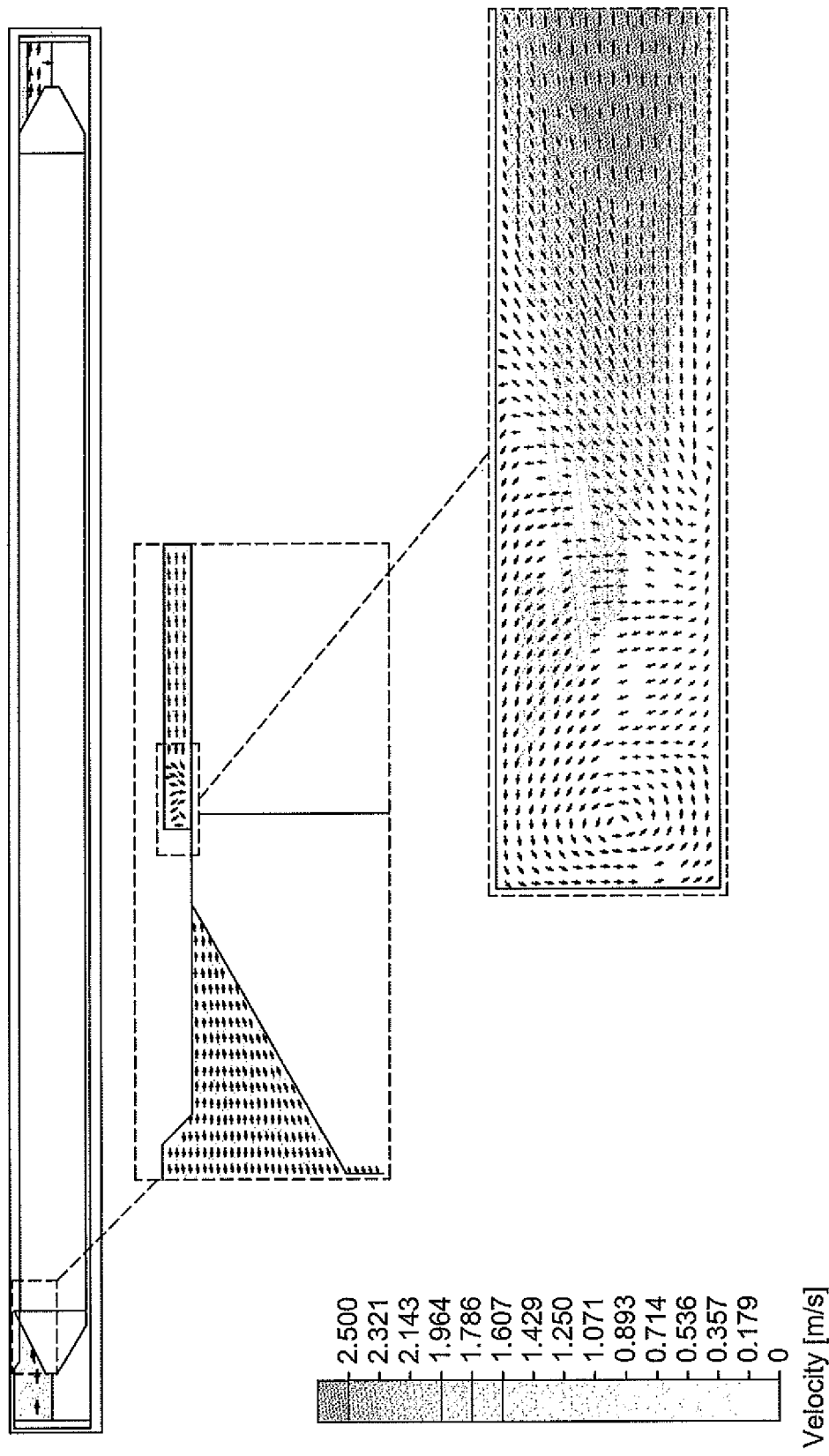
FIG. 31 includes contour maps of flow velocity through an electrochemical cell, according to one embodiment.

Example 2: Recirculation Effect Downstream from Separator and/or Electrical Connector Scaling may develop where the average flow velocity of the electrolyte solution is below a threshold value. The separator may be designed to minimize regions of low flow velocity downstream, for example, by having an aqualined configuration. As shown in the magnitude velocity contour maps of FIGS. 30-31, the flow velocity immediately downstream from a straight-edge separator approaches 0 m/s, which increases the probability of scale occurring at this location. The arrows point in the direction of flow and have a length indicating the magnitude of the flow velocity. FIG. 30 shows the contour map of a side view of the fluid channel, while FIG. 31 shows the contour map of a top view of the same fluid channel.

Figure 32:
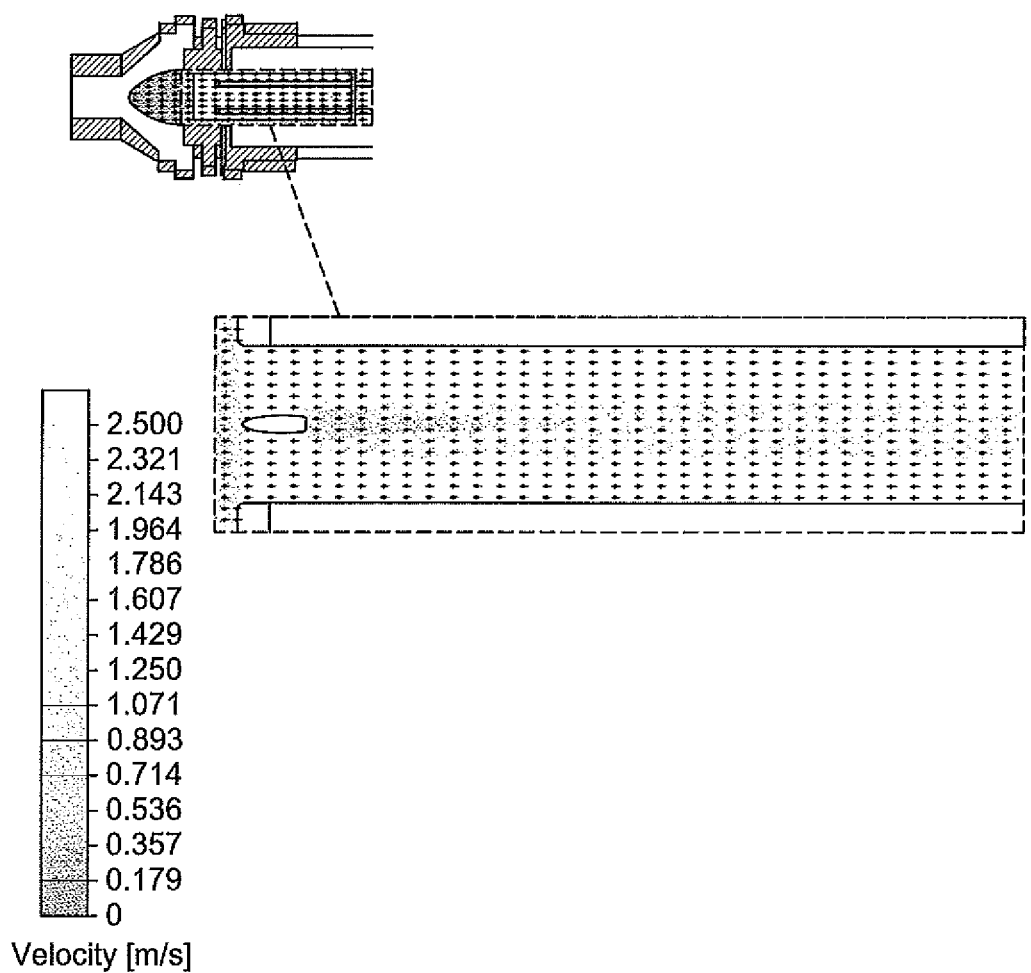
FIG. 32 includes contour maps of flow velocity through an electrochemical cell, according to one embodiment.

FIG. 32 is a magnitude velocity contour map of an aqualined separator. As shown in FIG. 32, the downstream flow is more uniform and has a smaller velocity deviation from mean. The velocity deviation from mean for the embodiment shown in FIG. 32 is plotted in the graph of FIG. 22. Assuming an electrolyte solution of seawater and an average flow velocity of 2 m/s, the percent velocity spread may cross the ±5% from mean threshold at about 100 mm flow distance (from the separator).

Thus, separators may be designed to create a more uniform downstream flow having a smaller velocity deviation from mean to reduce scaling. Such a design may also reduce a length of the zone of reduced velocity, adding the capability to operate at a lower average flow velocity (requiring less energy) and reducing or eliminating the need for acid washing of the electrochemical cell. Similar conditions may be determined for other electrolyte solutions and/or average flow velocities.

Example 3: Flow Parameters within Electrochemical Cell

For flow in a pipe, Reynolds number is generally defined as:

$$Re = \frac{\rho u D_H}{\mu} = \frac{u D_H}{\nu} = \frac{Q D_H}{\nu A}$$

where:
$D_H$ is hydraulic diameter of the pipe,
Q is volumetric flow rate (m$^3$/s),
A is the pipe's cross-sectional area (m$^2$),
u is the mean velocity of the fluid (m/s),
μ is the dynamic viscosity of the fluid (kg/(m*s),
ν is the kinematic viscosity (m$^2$/s), and
ρ is the density of the fluid (kg/m$^3$).

For an exemplary electrochemical cell having a plurality of fluid channels, the Reynolds number for fluid flow through the flow area between the inlet cone and fluid conduit was determined to be 57,847. The approximate entrance length through such a conduit is about 380 mm. For fully-developed flow, turbulence tends to occur at a Reynolds number greater than about 2600. Thus, the flow through the fluid conduit is highly turbulent.

For the same electrochemical cell, the Reynolds number for fluid flow through each of the concentric fluid channels was determined to be 14,581. The approximate entrance length for the fluid channels is about 70 mm. The flow through the fluid channels and downstream from the separators resembles laminar flow.

These values assume an electrolyte solution of seawater at 20° C. and an average flow velocity of 2 m/s. Similar conditions may be determined for other electrolyte solutions and/or average flow velocities.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure, and are intended to be within the scope of the invention. Accordingly, the foregoing description and drawings are by way of example only.

What is claimed is:

1. A self-cleaning electrochemical cell comprising:
    a plurality of electrodes disposed concentrically in a housing about a central axis of the housing;
    a fluid channel defined between adjacent electrodes of the plurality of electrodes and extending substantially parallel to the central axis; and
    an electrical connector positioned at a distal end of at least one of the plurality of electrodes and electrically connected to the at least one of the plurality of electrodes, the electrical connector being dimensioned to allow fluid flow through the fluid channel and provide a substantially even current distribution to the at least one of the plurality of electrodes while maintaining a zone of reduced velocity having less than a predetermined length within the fluid channel downstream of the electrical connector, the zone of reduced velocity defined by a region in the fluid channel in which fluid flow velocity deviates from a mean fluid flow velocity in the channel by within 20%.

2. The self-cleaning electrochemical cell of claim 1, wherein the electrical connector has an average resistivity of less than about 7.8×10$^{-7}$ ohm-meter.

3. The self-cleaning electrochemical cell of claim 2, wherein the electrical connector is dimensioned to generate less than about 25 W of heat when transmitting at least 100 W of power to the at least one of the plurality of electrodes.

4. The self-cleaning electrochemical cell of claim 3, wherein the electrical connector is dimensioned to generate less than about 25 W of heat when transmitting at least 1 kW of power to the at least one of the plurality of electrodes.

5. The self-cleaning electrochemical cell of claim 1, wherein the electrical connector comprises a wheel and a plurality of spokes extending from the wheel.

6. The self-cleaning electrochemical cell of claim 5, further comprising a separator disposed between the adjacent electrodes, the separator comprising a feature configured to mate with the electrical connector.

7. The self-cleaning electrochemical cell of claim 6, wherein the feature of the separator includes a slot configured to mate with a spoke of the electrical connector.

8. The self-cleaning electrochemical cell of claim 6, wherein each spoke of the plurality of spokes is dimensioned to minimize electrical resistance across the electrical connector and maintain a heat generation of the electrical connector to be less than about 0.1° C. when transmitting at least 100 W of power to the at least one of the plurality of electrodes.

9. The self-cleaning electrochemical cell of claim 6, wherein the plurality of spokes are substantially evenly distributed on the wheel.

10. The self-cleaning electrochemical cell of claim 6, wherein the spokes have an aqualined configuration in a direction parallel to the central axis of the housing.

11. The self-cleaning electrochemical cell of claim 1, comprising a plurality of fluid channels disposed concentrically between respective pairs of adjacent electrodes, wherein the electrical connector comprises a plurality of wheels and a plurality of spokes extending between adjacent wheels of the plurality of wheels.

12. The self-cleaning electrochemical cell of claim 11, wherein spokes extending from adjacent wheels are angularly offset from each other.

13. The self-cleaning electrochemical cell of claim 12, wherein the spokes extending from adjacent wheels are substantially equally angularly offset from each other.

14. A self-cleaning electrochemical cell comprising:
a plurality of electrodes disposed concentrically in a housing about a central axis of the housing;
a fluid channel defined between adjacent electrodes and extending substantially parallel to the central axis; and
an electrical connector positioned at a distal end of an electrode of the plurality of electrodes and electrically connected to the electrode, the electrical connector being dimensioned to allow fluid flow through the channel while maintaining a zone of reduced velocity having less than a predetermined length within the fluid channel downstream of the electrical connector, an electrolyte solution velocity deviation from mean at the predetermined length being less than ±5% of an average flow velocity of the electrolyte solution through the fluid channel, and control a temperature of electrolyte flowing through the fluid channel at about 2 m/s and having a temperature of about 20° C. to increase by less than about 0.5° C. while transmitting at least 100 W of power to the at least one of the plurality of electrodes.

15. The self-cleaning electrochemical cell of claim 14, wherein the electrical connector includes an electrical connection for connecting to an external source of power and electrical resistance of the electrical connector between the electrical connection and the electrode is less than about $5 \times 10^{-5}$ ohms.

16. The self-cleaning electrochemical cell of claim 14, wherein the electrical connector is dimensioned to provide a substantially even current distribution to the plurality of electrodes.

17. The self-cleaning electrochemical cell of claim 14, wherein the velocity deviation from mean at the predetermined length is less than ±2% of the average flow velocity of the electrolyte solution through the fluid channel.

18. The self-cleaning electrochemical cell of claim 1, wherein an electrolyte solution velocity deviation from mean at the predetermined length is less than ±5% of the average flow velocity of the electrolyte solution through the fluid channel.

19. The self-cleaning electrochemical cell of claim 18, wherein the velocity deviation from mean at the predetermined length is less than ±2% of the average flow velocity of the electrolyte solution through the fluid channel.

* * * * *